US012694027B2

(12) United States Patent
Xu et al.

(10) Patent No.: US 12,694,027 B2
(45) Date of Patent: ***Jul. 28, 2026

(54) GENERATIVE GRAPH-ENHANCED INFORMATION RETRIEVAL

(71) Applicant: Microsoft Technology Licensing, LLC, Redmond, WA (US)

(72) Inventors: Zhentao Xu, Sunnyvale, CA (US); Mark Jerome U. Cruz, San Jose, CA (US); Matthew R. Guevara, Pleasanton, CA (US); Tie Wang, San Jose, CA (US); Manasi R. Deshpande, Fremont, CA (US); Xiaofeng Wang, Princeton Junction, NJ (US); Zheng Li, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/200,433

(22) Filed: May 6, 2025

(65) Prior Publication Data

US 2025/0265248 A1 Aug. 21, 2025

Related U.S. Application Data

(63) Continuation of application No. 18/539,041, filed on Dec. 13, 2023, now Pat. No. 12,332,896.

(51) Int. Cl.
*G06F 16/2453* (2019.01)
*G06F 16/901* (2019.01)

(52) U.S. Cl.
CPC .... *G06F 16/24549* (2019.01); *G06F 16/9024* (2019.01)

(58) Field of Classification Search
None
See application file for complete search history.

*Primary Examiner* — Eddy Cheung
(74) *Attorney, Agent, or Firm* — Nicholson De Vos Webster & Elliott LLP

(57) ABSTRACT

Embodiments of the disclosed technologies include parsing a query into a first query portion and at least one second query portion, matching an embedding of the at least one second query portion with an embedding that corresponds to a portion of a document of a document set, mapping the portion of the document to a first node of a graph; by a generative artificial intelligence model, constructing a graph query based on at least the first node, executing the graph query on the graph to identify a second node of the graph, extracting a path from the graph, and configuring the path for output at a device.

20 Claims, 11 Drawing Sheets

FIG. 1C

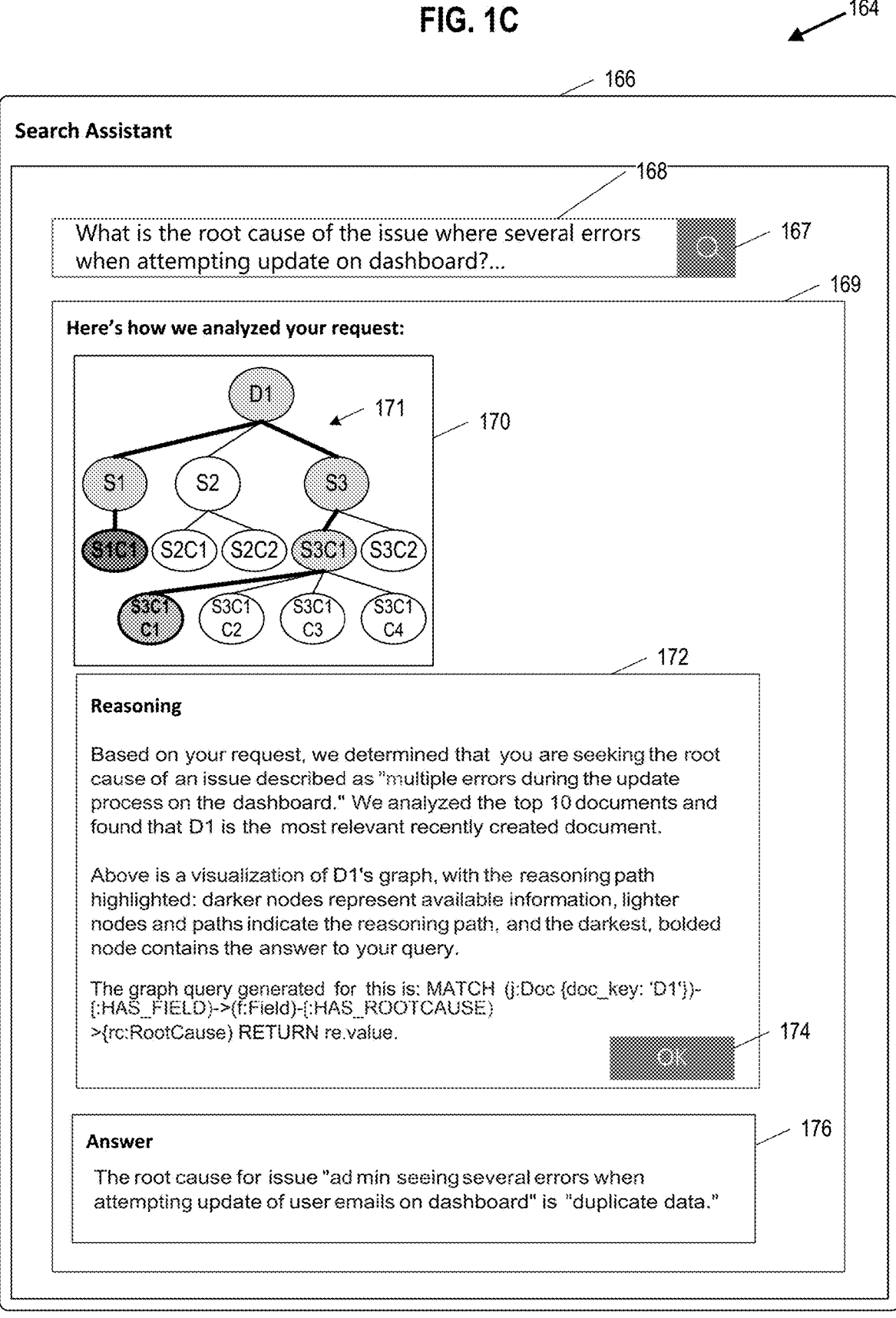

Search Assistant

What is the root cause of the issue where several errors when attempting update on dashboard?...

Here's how we analyzed your request:

Reasoning

Based on your request, we determined that you are seeking the root cause of an issue described as "multiple errors during the update process on the dashboard." We analyzed the top 10 documents and found that D1 is the most relevant recently created document.

Above is a visualization of D1's graph, with the reasoning path highlighted: darker nodes represent available information, lighter nodes and paths indicate the reasoning path, and the darkest, bolded node contains the answer to your query.

The graph query generated for this is: MATCH (j:Doc {doc_key: 'D1'})-[:HAS_FIELD]->(f:Field)-[:HAS_ROOTCAUSE]->(rc:RootCause) RETURN rc.value.

Answer

The root cause for issue "admin seeing several errors when attempting update of user emails on dashboard" is "duplicate data."

FIG. 1D

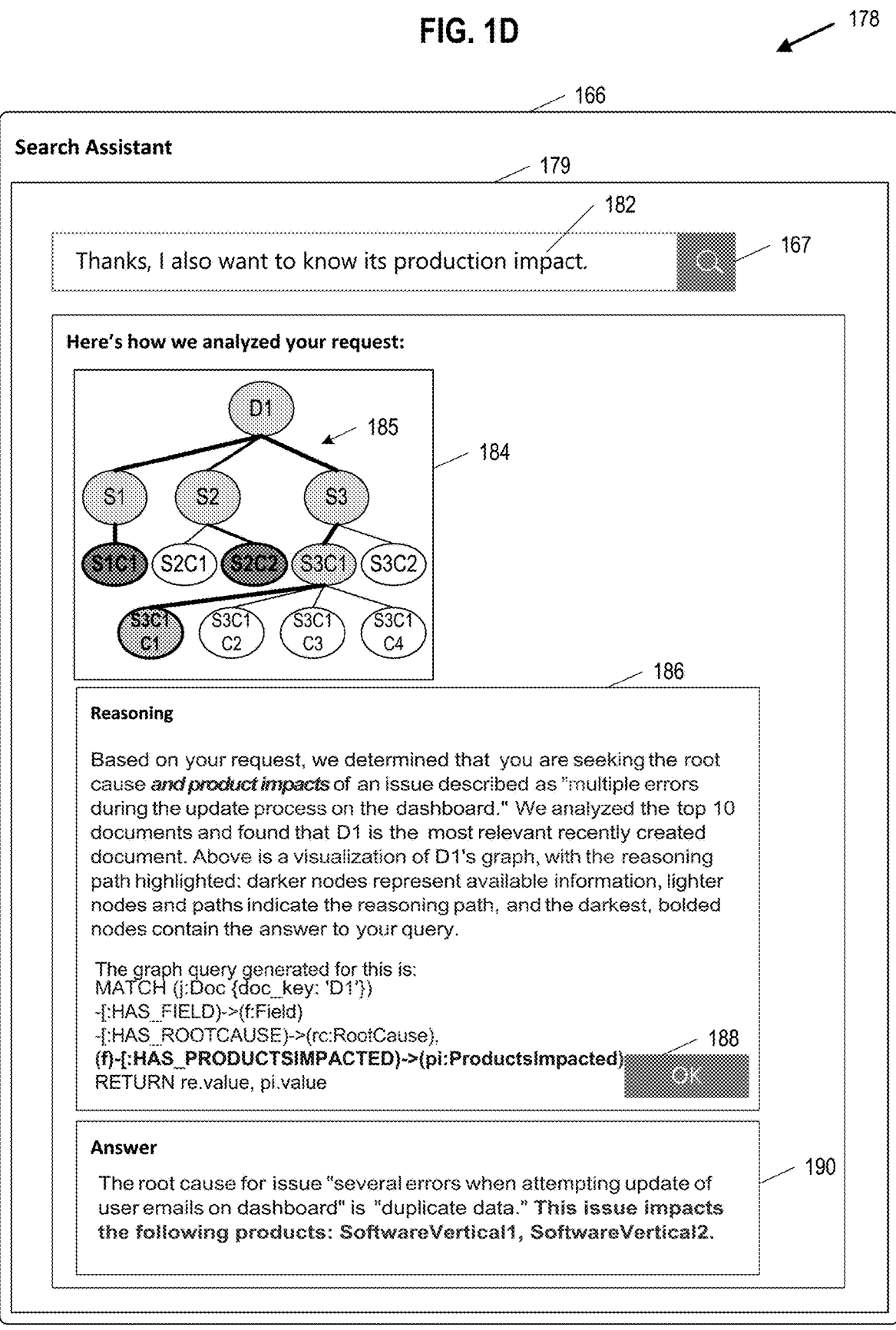

Search Assistant

Thanks, I also want to know its production impact.

Here's how we analyzed your request:

Reasoning

Based on your request, we determined that you are seeking the root cause *and product impacts* of an issue described as "multiple errors during the update process on the dashboard." We analyzed the top 10 documents and found that D1 is the most relevant recently created document. Above is a visualization of D1's graph, with the reasoning path highlighted: darker nodes represent available information, lighter nodes and paths indicate the reasoning path, and the darkest, bolded nodes contain the answer to your query.

The graph query generated for this is:
MATCH (j:Doc {doc_key: 'D1'})
-[:HAS_FIELD]->(f:Field)
-[:HAS_ROOTCAUSE]->(rc:RootCause),
(f)-[:HAS_PRODUCTSIMPACTED]->(pi:ProductsImpacted)
RETURN re.value, pi.value

Answer

The root cause for issue "several errors when attempting update of user emails on dashboard" is "duplicate data." This issue impacts the following products: SoftwareVertical1, SoftwareVertical2.

Figure 2:
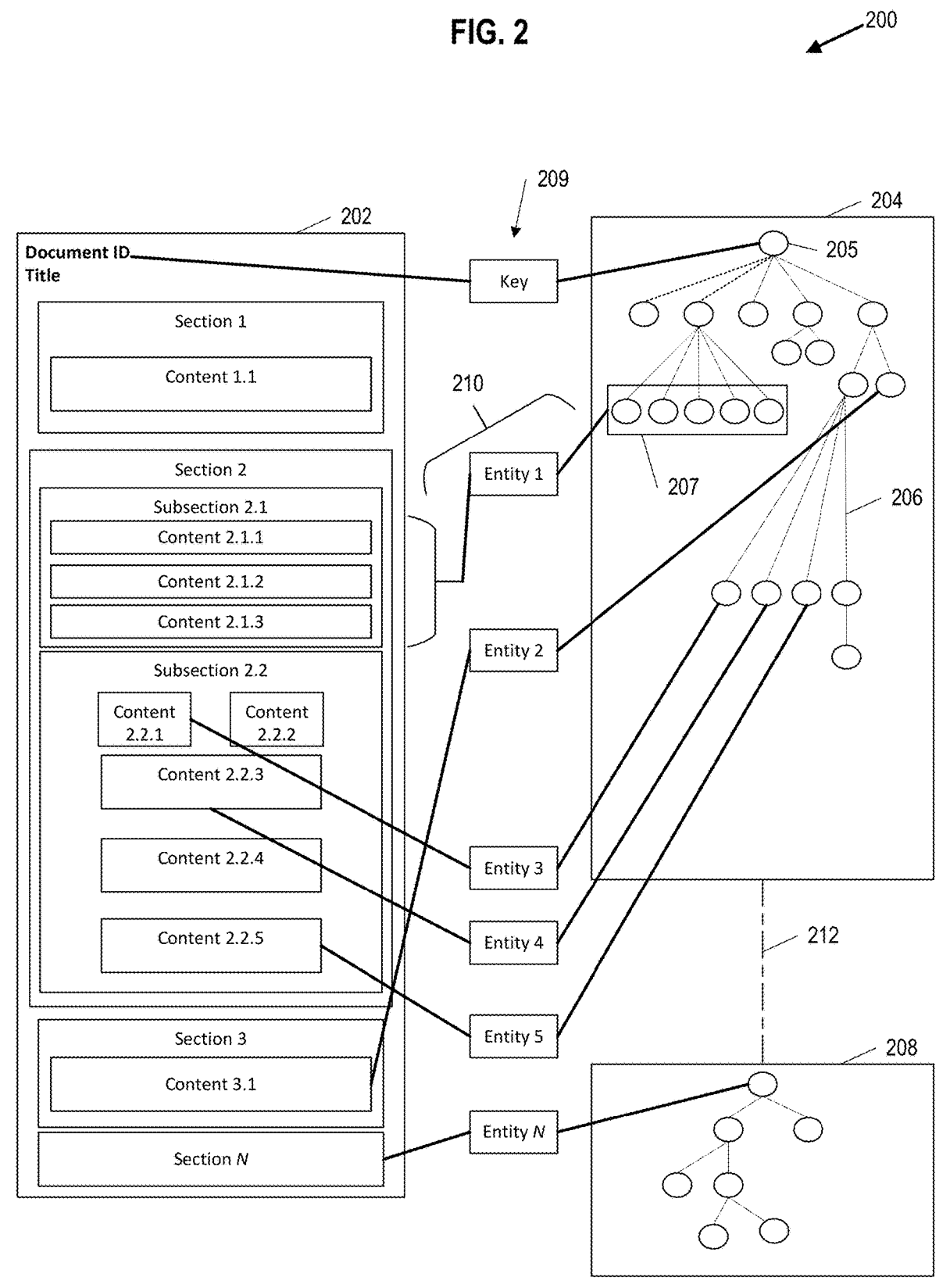

Document ID
Title

Key

205

Section 1

Content 1.1

210

207

206

Section 2

Subsection 2.1

Entity 1

Content 2.1.1

Content 2.1.2

Content 2.1.3

Subsection 2.2

Entity 2

Content
2.2.1

Content
2.2.2

Content 2.2.3

Content 2.2.4

Entity 3

Content 2.2.5

Entity 4

212

Section 3

Entity 5

208

Content 3.1

Section N

Entity N

Figure 6:
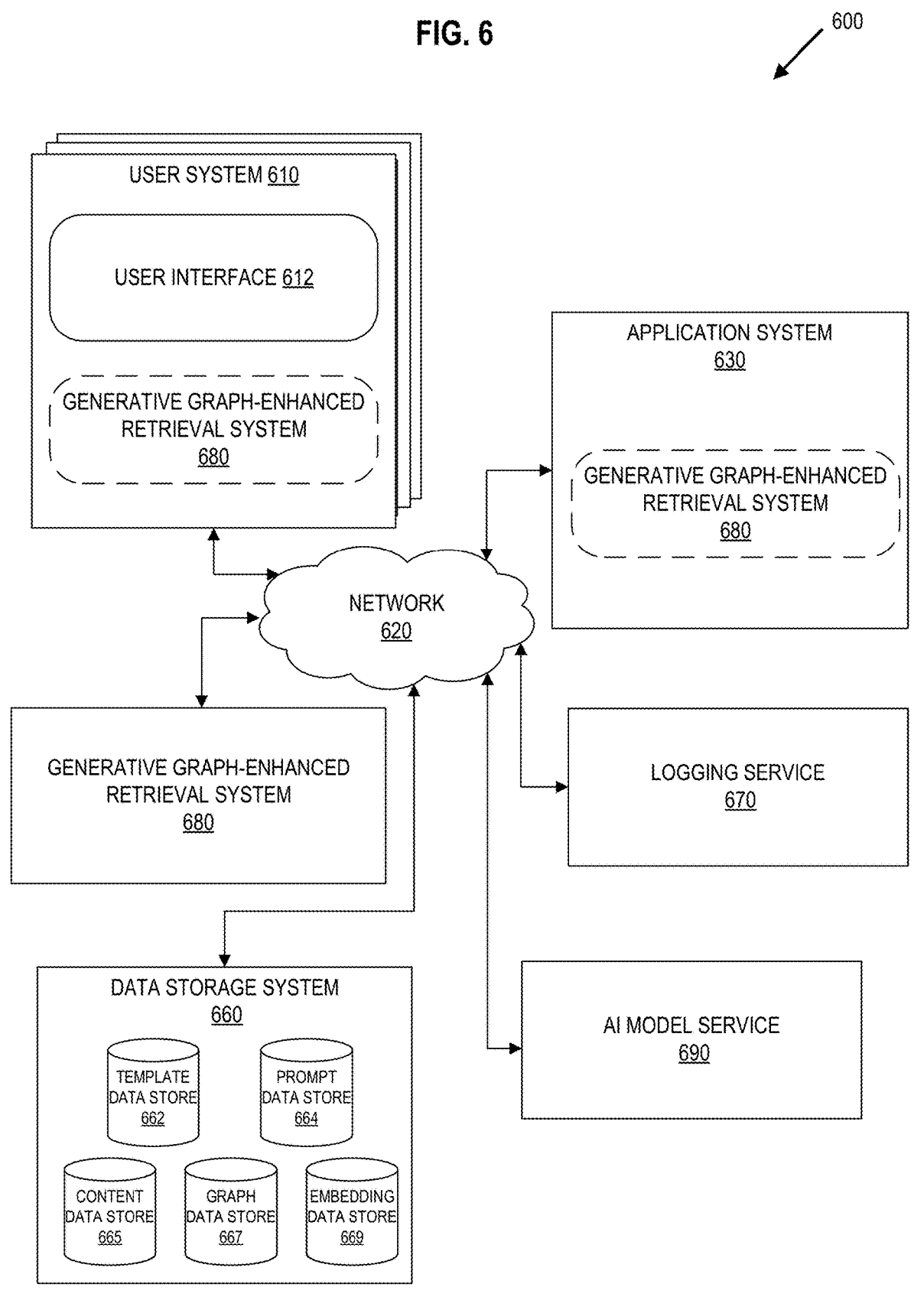

USER SYSTEM 610

USER INTERFACE 612

GENERATIVE GRAPH-ENHANCED
RETRIEVAL SYSTEM
680

APPLICATION SYSTEM
630

GENERATIVE GRAPH-ENHANCED
RETRIEVAL SYSTEM
680

NETWORK
620

GENERATIVE GRAPH-ENHANCED
RETRIEVAL SYSTEM
680

LOGGING SERVICE
670

DATA STORAGE SYSTEM
660

TEMPLATE
DATA STORE
662

PROMPT
DATA STORE
664

CONTENT
DATA STORE
665

GRAPH
DATA STORE
667

EMBEDDING
DATA STORE
669

AI MODEL SERVICE
690

Figure 7:
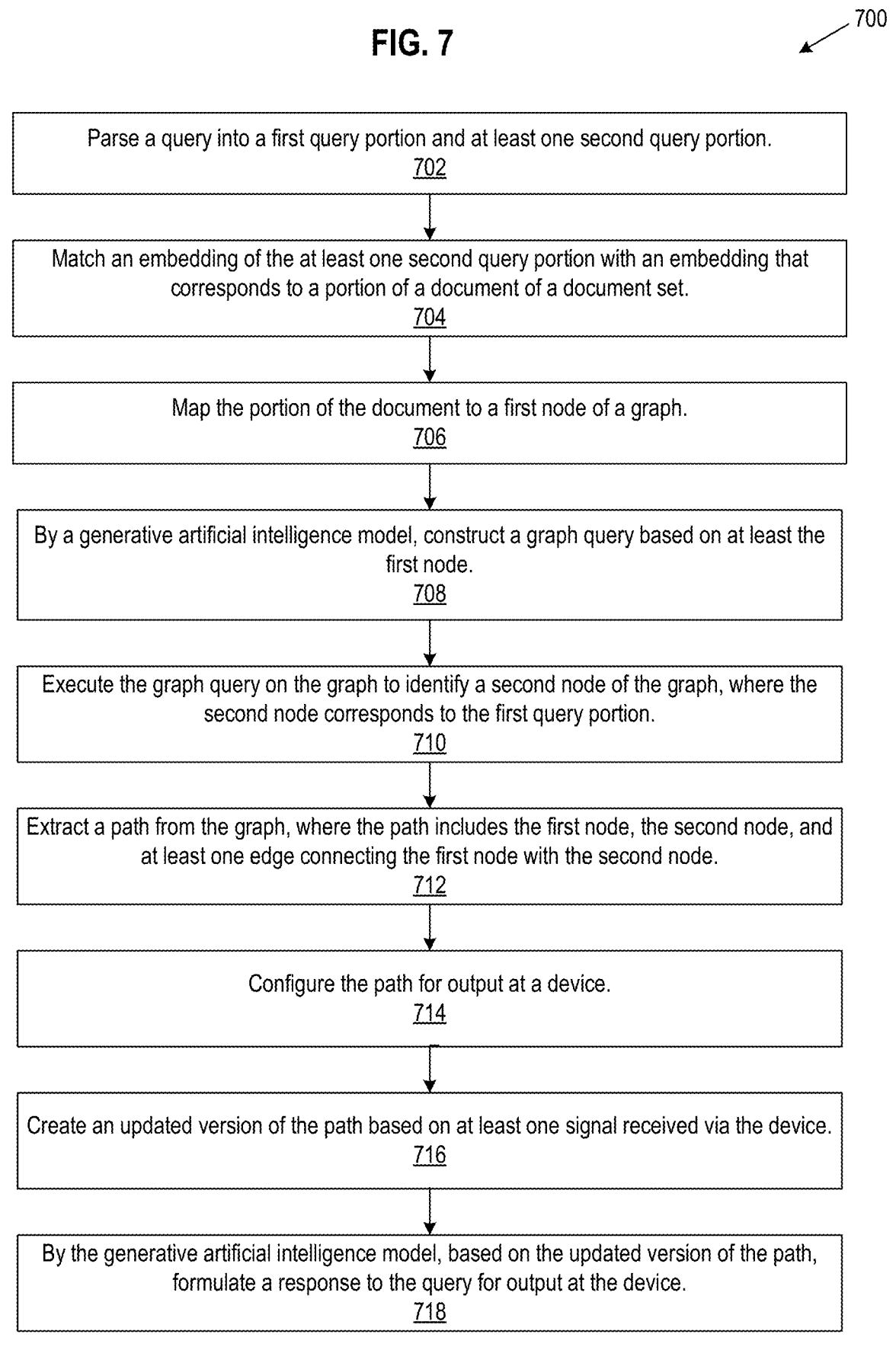

Parse a query into a first query portion and at least one second query portion.
702

↓

Match an embedding of the at least one second query portion with an embedding that corresponds to a portion of a document of a document set.
704

↓

Map the portion of the document to a first node of a graph.
706

↓

By a generative artificial intelligence model, construct a graph query based on at least the first node.
708

↓

Execute the graph query on the graph to identify a second node of the graph, where the second node corresponds to the first query portion.
710

↓

Extract a path from the graph, where the path includes the first node, the second node, and at least one edge connecting the first node with the second node.
712

↓

Configure the path for output at a device.
714

↓

Create an updated version of the path based on at least one signal received via the device.
716

↓

By the generative artificial intelligence model, based on the updated version of the path, formulate a response to the query for output at the device.
718

GENERATIVE GRAPH-ENHANCED INFORMATION RETRIEVAL

CROSS-REFERENCE TO RELATED APPLICATIONS

The present application is a continuation of U.S. patent application Ser. No. 18/539,041 filed Dec. 13, 2023, which is incorporated by reference herein.

TECHNICAL FIELD

A technical field to which this disclosure relates includes information retrieval systems.

COPYRIGHT NOTICE

BACKGROUND

An information retrieval system retrieves stored content in response to queries. A content distribution system is a computer system that is designed to receive, store, retrieve, and distribute information, such as posts, articles, videos, images, web pages, user profiles, and job postings, to computing devices for consumption by users of electronic devices. Examples of content distribution systems include news feeds, social network services, messaging systems, and search engines. A chatbot (or chat bot) is a software application that can retrieve content and answer questions by simulating a natural language conversation with a human user.

BRIEF DESCRIPTION OF THE DRAWINGS

The disclosure will be understood more fully from the detailed description given below and from the accompanying drawings of various embodiments of the disclosure. The drawings are for explanation and understanding only and should not be taken to limit the disclosure to the specific embodiments shown.

FIG. 1C and FIG. 1D illustrate examples of interactions involving a user interface for information retrieval, including visualizations of requests for information, graphs, reasoning, and answers, which may be generated and displayed using components of a generative graph-enhanced information retrieval system in accordance with some embodiments of the present disclosure.

FIG. 2 is a schematic diagram of an example of conversion process between a document and a graph representation of the document, which may be created and used for generative graph-enhanced information retrieval using components of a generative graph-enhanced information retrieval system in accordance with some embodiments of the present disclosure.

FIG. 6 is a block diagram of a computing system that includes a generative graph-enhanced information retrieval system in accordance with some embodiments of the present disclosure.

FIG. 7 is a flow diagram of an example method for generative graph-enhanced information retrieval using components of a generative graph-enhanced information retrieval system in accordance with some embodiments of the present disclosure.

DETAILED DESCRIPTION

Figure 1A:
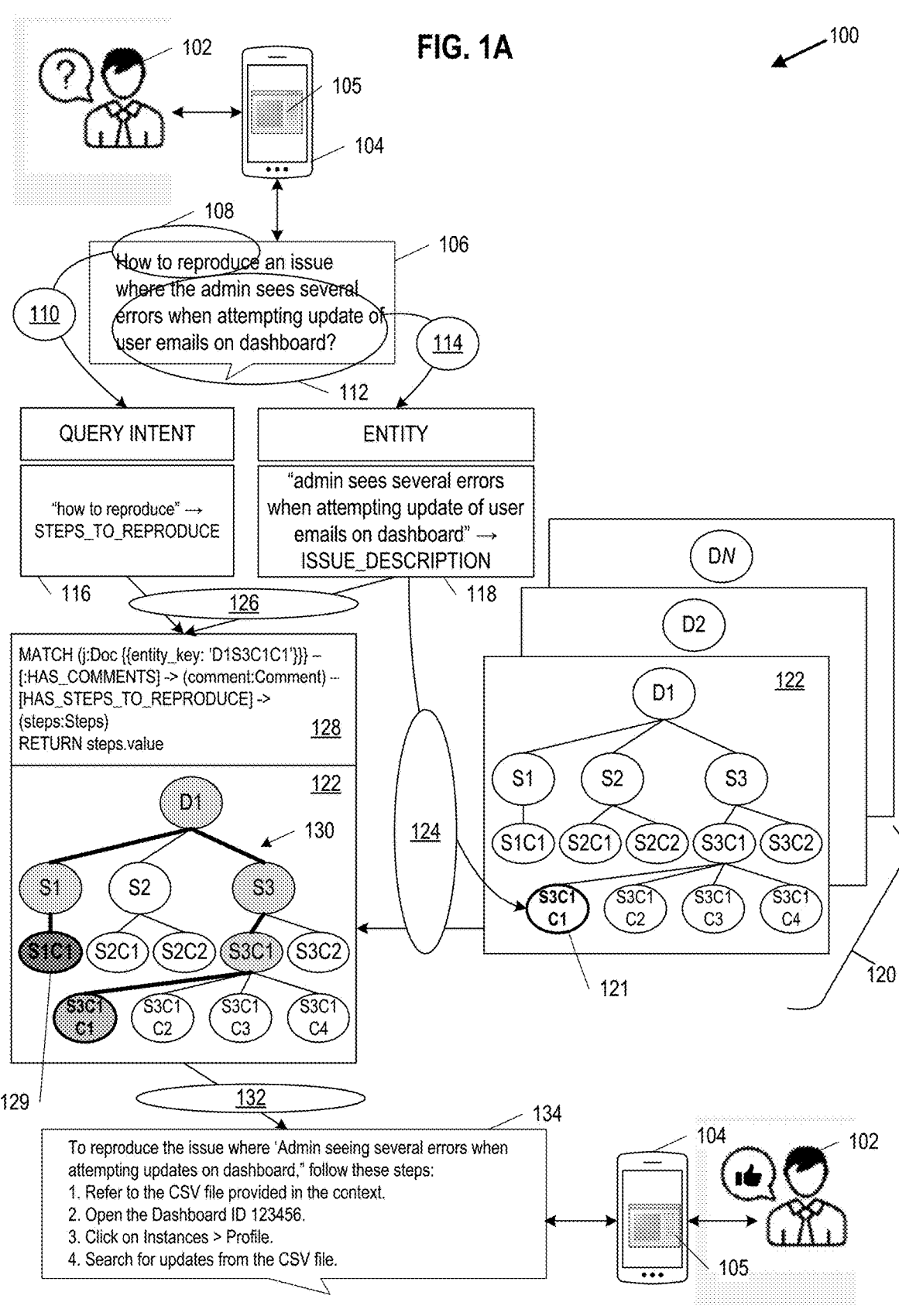
FIG. 1A is a flow diagram of an example method for generative graph-enhanced information retrieval using components of a generative graph-enhanced information retrieval system in accordance with some embodiments of the present disclosure.

Cluttered datasets include sets of documents in which information relevant to a query may be dispersed or scattered across different documents and/or across different sections of the same document. For example, different pieces of information about a topic that is related to a question or issue sought to be addressed by the query may be located in different portions of a document or documents, and the information needed to provide the type of response requested by the query may be located in still other portions of the same document or across different documents. That is, some types of queries require information retrieval systems to determine and find relevant information for both the question or issue being presented by the query and also the type of response being requested by the query.

The term distance may be used to refer to a gap between the respective logical and/or physical locations in computer memory of different pieces of information in a document set that are all relevant to the same query. For example, different but related pieces of information may be stored in different files, or in different fields of the same database table or record, or in different database tables or records of the same database, or in different databases. Alternatively or in addition, different but related pieces of information may be stored in different on different physical (e.g., different addresses in physical memory) or logical (e.g., different addresses in virtual memory) locations on the same device or different devices.

In cluttered datasets, relationships between dispersed pieces of information may not be explicit and may be challenging to determine using conventional predictive approaches or rules. For instance, conventional information retrieval approaches are unable to effectively identify and piece together relevant, but dispersed, pieces of information stored in different locations of cluttered datasets. As an undesirable consequence, conventional approaches will incorrectly return no information to the user (zero results), even though the dataset actually does contain the information requested by the query.

In the domain of issue tracking, for example, a problem or issue may be identified by a customer using a product, and an issue tracking system may be used to log the problem or issue. Over time, the issue tracking system becomes a knowledge base of resolved and unresolved issues related to the product. As such, the issue tracking knowledge base can be searched to determine an appropriate answer or resolution to subsequently presented problems or issues. For instance, an issue tracking system may contain a searchable dataset of documents, where each document contains information about an incident that has been identified by a customer and whether and how the incident was resolved. Document as used herein may refer to one or more digital files including text, audio, video, imagery, and/or other digital content. Examples of documents include web pages, issue tickets, multimedia documents, articles, posts, comments, messages, audio recordings, videos, images, graphics files, and any combination of any of the foregoing. Different portions of a document can be stored in different logical and/or physical parts of a computer system (e.g., different database records, fields, blobs, or tables, and/or different memory locations). In the example of the issue tracking domain, a document may be referred to as an issue ticket or simply as a ticket.

In the issue tracking example, sometimes, a customer's issue or incident is not resolved before the corresponding ticket is closed out, such that the corresponding ticket contains a description of the problem but does not contain a solution. Other times, the root cause of the customer's issue is not apparent from the customer's ticket, but is described in a different ticket that is not explicitly linked with the customer's ticket. In still other cases, multiple different engineering or support teams address different aspects of the same problem and thus document their work separately, potentially using different terminology. These examples illustrate aspects of cluttered datasets that present technical challenges for information retrieval systems to locate and connect dispersed pieces of relevant information in response to a query.

As an illustrative, nonlimiting example, suppose that a cluttered dataset contains three issue tickets, among other documents. The first ticket relates to an issue of an online service being down due to a problem with a real-time data store. The second ticket identifies a complaint about a database and contains an explanation about why the database is failing. The third ticket includes a note that the database failure is related to a different problem in the computing infrastructure. Given the disorganized and dispersed nature of the information in the dataset, conventional text-based information retrieval techniques (e.g., string matching or conventional embedding-based retrieval without the graph enhancements described herein) are likely to return no results in response to a query that requests the root cause of the online service outage. This is because the conventional text-based techniques are unable to determine that these disparate pieces of information are related to the same problem or are unable to identify the connections among the related but not explicitly connected tickets.

Thus, given a cluttered dataset, a technical challenge is how to interpret a query into a description of a question or issue to be addressed so that the resulting interpretation of the query matches appropriately relevant documents in the dataset. For example, the query might not mention a database failure, even though database failures may be related to the problem identified by the query.

Still another technical challenge is how to convert a query that contains unstructured data, such as conversational natural language text, images, or videos, to structured data so as to enable an embedding retrieval process. For example, embodiments of the described approaches are capable of parsing unstructured data in a document into a structured graph representation of the document.

Another technical challenge is, given an appropriately interpreted query, how to find and extract information from a dataset that matches the desired type of response. For example, if the user is a technical support analyst, the user might not be seeking a direct answer or solution to the identified problem, but rather a list of steps to follow to reproduce the problem, so that the analyst can perform further analysis.

Yet another technical challenge is, given a lack of explicit connections between dispersed pieces of information in the cluttered dataset, how to provide an explanation to the user as to how dispersed pieces of information used to formulate a response to the query were retrieved, connected, and pieced together.

An additional technical challenge is how to enable the user to interact with an explanation of the information retrieval process via a user interface so as to reduce the burden of user input during the information retrieval process and improve confidence in the search results.

Embedding-based retrieval is a method of searching for similar digital content, such as documents or portions of documents. Embedding-based retrieval involves converting digital content items to embeddings and then using a similarity algorithm, such as nearest-neighbor search or cosine similarity, to identify embeddings that are similar to one another.

Embedding as used herein may refer to a numerical representation of a piece of content. The embedding may encode information about the content relative to an embedding space. Embeddings and embedding spaces can be generated by artificial intelligence (AI) models. An embedding can be expressed as a vector, where each dimension of the vector includes a numerical value that can be an integer or a real number. The numerical value assigned to a given dimension of the vector conveys information about the piece of content represented by the embedding, relative to the embedding space, also referred to as a vector space. The embedding space (or vector space) includes all of the possible values of each dimension of the vector. The embedding space is defined by the way in which the AI model used to generate the vector has been trained and configured, including the training data used to train the AI model. In some implementations, train as used herein refers to an iterative process of applying an AI algorithm to one or more sets of training data, analyzing the output of the AI model in comparison to expected model output using a loss function (also referred to as a cost function or error function), adjusting one or more parameters and/or coefficients of the AI model, and repeating the process until the actual model output matches the expected model output within an acceptable amount of error or tolerance.

Generative AI models include AI models that can generate and output new digital content based on and in response to an input. For example, given a question, the generative AI model can generate and output a previously-unseen natural language answer to the question. Embedding-based retrieval can be used in conjunction with an AI model to improve the output produced by the generative AI model. For example, embedding-based retrieval can be used to identify content to be included in the input that is provided to the generative AI model along with a query, so that the output generated by the AI model is based on both the query and the content identified through the use of embedding-based retrieval.

While supplementing embedding-based retrieval with generative AI may provide acceptable results for straightforward use cases, experiences with this approach have shown unacceptably low retrieval performance and low answer generation performance on more complex information retrieval tasks, such as searches of cluttered datasets and queries that require multiple retrieval tasks to be performed in order to return the requested information (e.g., a more general search for relevant information and a more specific search for the particular type of response being requested). Another example of a complex information retrieval task is when a query contains a question that is "knowledge-intense," in the sense that some reasoning and/or derivation is required to determine the most relevant response (in contrast to simple retrieval, which only requires matching and does not require any reasoning or derivation). These and other types of complex information retrieval tasks are not suitable for embedding-based retrieval alone, because in the more complex cases, matching question-answer pairs do not exist (hence, the zero results outcome with embedding-based retrieval used alone).

To address these and other technical challenges, embodiments of the disclosed technologies provide generative, graph-enhanced information retrieval approaches that can be used in the context of online query processing and real-time information retrieval. Real time or real-time, as used herein, may refer to a level of computer responsiveness within a specified time constraint, usually milliseconds or microseconds, between an event and its response time. Real time can describe the sense of time experienced by a computer user (as opposed to machine time), which is perceived by the user as immediate.

Embodiments of the disclosed approaches create a structured, graph representation of a set of documents (e.g., a cluttered dataset). The graph includes intra-document graphs of the documents in the dataset and links or edges that connect nodes within the intra-document graphs as well as edges that connect intra-document graphs to form one or more inter-document graphs. The graph includes a network of root nodes and non-root nodes connected by edges. The root nodes correspond to documents in the dataset, the non-root nodes represent entities (such as people, places, things, or concepts) extracted from the documents, and the edges represent relationships between or among entities and/or documents. In a hierarchical (e.g., tree-based) graph structure, root nodes have at least one child node but do not have a parent node. Non-root nodes include both leaf nodes (nodes that share an edge with a parent node but do not have any child nodes) and intermediate nodes (nodes that have both a parent node and at least one child node).

In the disclosed approaches, embeddings are created at the non-root node level, such that the resulting knowledge base contains interconnected graph nodes, linkages among nodes and corresponding document portions, and linkages among nodes, embeddings corresponding to the respective document portions associated with the nodes, and the respective document portions. This is in contrast to prior approaches that divide documents into chunks and create embeddings based on the chunks.

Whereas the prior approaches create chunks of a document by applying a brute-force truncation method to the plain text of the document, the disclosed approaches intelligently identify entity-related content in the document, associate the entity-related content with a corresponding graph node, create an embedding of the entity-related content, and associate the embedding with the respective graph node. Whereas the prior approaches do not maintain any relationships between the chunks, the disclosed approaches build a graph of each document that maintains the relationships among the various entity-related pieces of content by virtue of their representation by nodes and edges in the graph.

The graph of a document set created according to the disclosed approaches can be used, for instance, to answer complicated questions that cannot be answered solely by a text similarity-based method. For example, queries involving multiple pieces of content that are dispersed across different sections of the document can be captured by the graph. Additionally, questions involving pieces of content dispersed across multiple documents can be answered via inter-document links in the graph.

In embodiments of the disclosed approaches, at online query/information retrieval time, embedding-based retrieval is used initially to identify nodes or subgraphs of the overall graph of the document dataset that are relevant to a query, and then graph-based retrieval is used to extract, from the graph, using the nodes or subgraphs identified via embedding-based retrieval, a path that identifies content that is responsive to the query. The path is provided, along with the original query, as input to a generative AI model. Based on the path and the original query, the generative AI model generates and outputs a response or answer to the query that is suitable for consumption by, e.g., a requesting user. For example, the generative AI model converts the path identified by the graph query into natural language text or machine-generated speech containing information extracted from the document dataset based on the path, alone or in combination with one or more other forms of digital content (e.g., digital imagery, video, audio, hyperlinks, etc.).

In some implementations, aspects of the generative graph-enhanced query interpretation and information retrieval process, including intermediate results or output, are presented to the requesting user graphically. For example, a visual representation of the path created in response to the user's query is presented via a user interface at the user's electronic device in a manner that enables the user to interact with the visualization of the path. Signals received from the user's device, such as user interactions with the graph and/or the visualization of the path, can be processed and used subsequently to modify the path, to fine tune the user's query, to fine tune the system's response to the query, or to otherwise improve the information retrieval process.

Implementing an online graph searching mechanism poses unique technical challenges, such as how to implement real-time data processing and how to accomplish efficient online graph navigation, interaction, and modification. In contrast to prior approaches, embodiments of the disclosed approaches make online graph searching feasible. This represents a fundamental shift from conventional offline graph construction methods. Online graph searching as described herein allows for dynamic, real-time processing and adaptation to new data, which is a significant departure from the static nature of offline graph construction.

In more detail, the disclosed approaches can adapt to, for example, both follow-up questions from users and new documents added to the document dataset. For example, suppose a new document (e.g., a newly uploaded issue ticket) is added to the document dataset after the graph of the dataset is created. Using the graph construction approaches described, the newly added document can be incrementally parsed to create nodes and links that correspond to portions of the document, as described, and then the document and its corresponding nodes and links can be incorporated into the existing graph database without modifying the existing database. For example, a new intra-document graph can be added to the existing graph database without impacting the remaining portions of the graph database unless one or more portions of the new document are related to one or more other documents represented in the graph database, in which case one or more inter-document links may be added in addition to the new intra-document graph. This incremental graph database updating approach is much less time consuming than the conventional approach of offline static graph searching, which requires the graph structure to be re-estimated and the embeddings to be re-calculated every time the dataset is updated.

Embodiments of the described approaches leverage a large language model to accomplish many of the steps of the online, real-time searching and retrieval process, thereby enabling flexible graph construction and exploration. Embodiments of the online query processing pipeline described can achieve real-time data processing by using the described intent prediction and query tagging approaches, and can achieve efficient online real-time graph navigation via the described online graph path identification approaches, including EBR-based graph node information fetching, and are capable of providing online real-time graph interaction and path modification. More specifically, for example, embodiments achieve acceptable latency for real-time applications by using embedding-based retrieval initially to narrow down the search space prior to graph construction and path determination. Alternatively or in addition, the use of a large language models at one or more phases of the query processing pipeline can further improve latency to make real-time processing feasible.

Certain aspects of the disclosed technologies are described in the context of cluttered datasets and issue tracking systems that include electronic searches conducted via a network with at least one information retrieval system, such as a message- or chat-based information retrieval system or a search service of an online system such as a search engine or social network system. However, aspects of the disclosed technologies are not limited to cluttered datasets or issue tracking systems, or to message- or chat-based information retrieval systems, search engines, or social network services, but can be used to improve various types of applications that use information retrieval technologies. Any network-based application can act as an application to which the disclosed technologies can be applied. For example, news, entertainment, and e-commerce applications, enterprise systems, messaging systems, notification systems, search engines, workflow management systems, collaboration tools, and social graph-based applications can all function as applications with which the disclosed technologies can be used.

The disclosure will be understood more fully from the detailed description given below, which references the accompanying drawings. The detailed description of the drawings is for explanation and understanding, and should not be taken to limit the disclosure to the specific embodiments described.

In the drawings and the following description, references may be made to components that have the same name but different reference numbers in different figures. The use of different reference numbers in different figures indicates that the components having the same name can represent the same embodiment or different embodiments of the same component. For example, components with the same name but different reference numbers in different figures can have the same or similar functionality such that a description of one of those components with respect to one drawing can apply to other components with the same name in other drawings, in some embodiments.

Also, in the drawings and the following description, components shown and described in connection with some embodiments can be used with or incorporated into other embodiments. For example, a component illustrated in a certain drawing is not limited to use in connection with the embodiment to which the drawing pertains, but can be used with or incorporated into other embodiments, including embodiments shown in other drawings.

As used herein, dialog, chat, or conversation may refer to one or more conversational threads involving a user of a computing device and an application. For example, a dialog or conversation can have an associated user identifier, session identifier, conversation identifier, or dialog identifier, and an associated timestamp. Thread as used here may refer to one or more rounds of dialog involving the user and an application. A round of dialog as used herein may refer to a user input and an associated system-generated response, e.g., a reply to the user input that is generated at least in part via a generative artificial intelligence model. Any dialog or thread can include one or more different types of digital content, including natural language text, audio, video, digital imagery, hyperlinks, and/or multimodal content such as web pages.

FIG. 1A is a flow diagram of an example method for generative graph-enhanced information retrieval using components of a generative graph-enhanced information retrieval system in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of a generative graph-enhanced retrieval system, including, in some embodiments, components or flows shown in FIG. 1A that may not be specifically shown in other figures and/or including, in some embodiments, components or flows shown in other figures that may not be specifically shown in FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 1A, the method is performed by an example computing system 100, which includes an example generative graph-enhanced retrieval system. In the example of FIG.

1A, the components of the generative graph-enhanced retrieval system are implemented using an application server or server cluster, which can include a secure environment (e.g., secure enclave, encryption system, etc.) for the processing of data. In some implementations, one or more components of the generative graph-enhanced retrieval system are implemented on a client device, such as a user system 610, described herein with reference to FIG. 6, running an application 105, alone or in combination with one or more servers. For example, some or all of generative graph-enhanced retrieval system is implemented directly on the user's electronic device in some implementations, thereby avoiding the need to communicate with servers over a network such as the Internet. In some implementations, the generative graph-enhanced retrieval system is in bidirectional communication with one or more applications via a computer network. The one or more applications include front end user interface functionality that, in some embodiments, is considered part of or is in communication with generative graph-enhanced retrieval system, e.g., application 105.

In the embodiment of FIG. 1A, the generative graph-enhanced retrieval system includes structural components (e.g., computer code and/or data embodied in one or more non-transitory machine-readable media) that are identified in FIG. 1A by reference numbers 110 (intent understanding), 114 (entity extraction), 124 (embedding-based retrieval), 126 (graph query generation and path extraction), and 132 (response generation).

FIG. 1A and the accompanying description relate to an online query processing and information retrieval process that can be performed in real time. In the example method, a user 102 operates an electronic device 104 to interact with application 105. The electronic device is, for example, a mobile computing device such as a smartphone or tablet computer, a laptop or desktop computer, a wearable device, a smart appliance, or an electromechanical device that includes an embedded system. Via the application 105, the user 102 inputs a query 106. Intent understanding component 110 reads the query 106 and identifies a first query portion 108 of the query 106 as corresponding to a canonical intent label. Intent understanding component 110 interprets or translates the first query portion 108 into a query intent 116. The query intent 116 is a structured representation of the first query portion 108 that includes the first query portion 108 and an intent label of STEPS_TO_REPRODUCE. As described in more detail below, some embodiments of intent understanding component 110 pass or otherwise communicate the query 106 to a large language model along with a graph template and an instruction to identify and extract the query intent 116, and receive the query intent 116 from the large language model. Pass as used herein may refer to a mechanism by which data is transferred (e.g., as an argument or parameter) between components of a computing system, such as an application programming interface (API), function call, or other communication mechanism.

Entity extraction component 114 reads the query 106 and identifies a second query portion 112 of the query 106 as corresponding to a canonical entity label. Entity extraction component 114 interprets or translates the second query portion 112 into an entity 118. The entity 118 is a structured representation of the second query portion 112 that includes the second query portion 112 and an entity label of ISSUE DESCRIPTION. As described in more detail below, some embodiments of entity extraction component 114 pass or otherwise communicate the query 106 to a large language model along with a graph template and an instruction to identify and extract the entity 118, and receive entity 118 from the large language model. While the example of FIG. 1A illustrates the extraction of a single entity 118 from the query 106, entity extraction component 114 can be configured to extract multiple entities from the query 106 depending on the query 106 and/or the graph template that is used.

This disclosure uses terminology such as "first query portion" and "second query portion" for ease of discussion, and not to imply order or location of query portions within the query. The order and location of the query portions can vary. More specifically, the first query portion and the second query portion are not fixed in their sequence or position within the query. For example, the entity does not always follow the intent in a query. In some queries, the intent precedes the entity or is located between or among different entities. Similarly, as between intent understanding component 110 and entity extraction component 114, the order of operations of these components is interchangeable. For example, the entity extraction could occur before or concurrently with the intent determination.

The canonical labels referenced by intent understanding component 110 and entity extraction component 114 are pre-defined according to the requirements of a particular design or implementation of the generative graph-enhanced retrieval system and stored by, e.g., a graph template, taxonomy, ontology, or vocabulary. For instance, in the example of FIG. 1A, the canonical labels are defined in accordance with the requirements of an issue tracking system. In other embodiments, the canonical labels are defined differently. For example, the canonical labels may be customized according to the requirements of a job searching system, a product searching system, a job candidate searching system, or any other search domain.

In the example of FIG. 1A, the intent understanding component 110 and the entity extraction component 114 are identified as separate components to illustrate the identification of at least two different query portions of the query 106. However, intent understanding component 110 and entity extraction component 114 can be implemented as a single component. For example, a query intent can be considered as one type of entity such that entity extraction component 114 identifies the first query portion 108 as corresponding to a first entity type (e.g., an entity type of query intent) with a value of STEPS_TO_REPRODUCE, and also identifies the second query portion 112 as corresponding to a second entity type (e.g., an entity type of entity) with a value of ISSUE_DESCRIPTION.

Embedding-based retrieval component 124 creates an embedding of the entity 118 and executes an embedding-based retrieval process on a graph 120 to identify a first node 121, e.g., node S3C1C1 of graph 120. Graph 120 is a graph of a document set that includes N documents, where N is a positive integer. The graph 120 includes an intra-document graph for each of the N documents in the document set, e.g., an intra-document graph for each of documents D1, D2, and DN. The graph 120 also includes inter-document links or edges that connect at least some of the intra-document graphs to form the overall graph 120. An example of a graph generation process by which the graph 120 may be created and updated is described in more detail below with reference to FIG. 5.

To create the embedding of the entity 118, embedding-based retrieval component 124 applies an embedding function to the entity 118. The embedding function is implemented using a pre-trained transformer-based machine learning model, such as a BERT (Bidirectional Encoder Representations from Transformers) deep learning model, in some embodiments, but other types of embedding functions may be used. As described in more detail below, the same embedding function is also used to create embeddings of each of the nodes of the graph 120, e.g., as part of or subsequent to the graph generation process described with reference to FIG. 5, and these node-level embeddings associated with the graph 120 are stored in a searchable embedding data store.

Embedding-based retrieval component 124 matches an embedding of the first node 121 with the embedding of the entity 118. Match as used herein refers to a computed degree of similarity that satisfies (e.g., meets or exceeds) a threshold level of similarity, where the threshold level of similarity is established based on the requirements of a particular design or implementation. For example, the threshold level of similarity may be set lower or higher for different information retrieval domains.

Based on the matching of the embedding of the first node 121 with the embedding of the entity 118, a subgraph 122 of the graph 120 is identified. The subgraph 122 is an intra-document graph of a document D1 that contains the first node 121. The first node 121 corresponds to a particular portion of the content of the document D1 (e.g., a segment of text, an image, video portion, audio portion, etc.).

Graph query generation and path extraction component 126 receives as input and processes the query intent 116, the entity 118, the first node 121, and the subgraph 122 to generate a graph query 128, execute the graph query 128 on the subgraph 122, identify a second node 129 as corresponding to the query intent 116, and create and extract a path 130 from the subgraph 122. The path 130 includes the first node 121, the second node 129, and at least one edge connecting the first node 121 with the second node 129. In FIG. 1A, the edges of the path 130 are shown in bold and the nodes included in the path 130 are shaded.

As described in more detail below with reference to FIG. 4, some embodiments of graph query generation and path extraction component 126 are implemented using a large language model, for example, a generative artificial intelligence model such as CHATGPT. For instance, in some embodiments, the graph query generation and path extraction component 126 passes the query intent 116, the entity 118, the first node 121, and the subgraph 122 to a generative artificial intelligence model with instructions to generate the graph query 128 based on the query intent 116, the entity 118, the first node 121, and the subgraph 122, and to execute the graph query on the graph 120 to identify the second node 129 and extract the path 130, and then the graph query generation and path extraction component 126 receives the second node 129 and the path 130 from the generative artificial intelligence model.

Response generation component 132 converts the path 130 to a response 134. The response 134 is configured for output to the device 104, e.g., for display to the user 102 via the app 105. In the example of FIG. 1A, the path 130 is converted to a natural language description of the entity 118 and the intent 116; that is, the response 134 is responsive to the intent 116 ("follow these steps") and identifies the issue identified by the entity 118. As described in more detail below with reference to FIG. 4, some embodiments of response generation component 132 are implemented using a large language model, for example, a generative artificial intelligence model such as CHATGPT. For instance, in some embodiments, the response generation component 132 passes the query 106 and the path 130 to a generative artificial intelligence model with instructions to generate the response 134 based on the query 106 and the path 130, and then the response generation component 132 receives the response 134 from the generative artificial intelligence model.

Example embodiments of each of the above-identified components 110 (intent understanding), 114 (entity extraction), 124 (embedding-based retrieval), 126 (graph query generation and path extraction), and 132 (response generation) are described in more detail below. Also, as described in more detail below, one or more language models, such as a generative artificial intelligence model, e.g., a large language model, and/or another type of language model, can be included as part of the generative graph-enhanced retrieval system or a separate component accessed by one or more components of the generative graph-enhanced retrieval system. For example, a large language model can be hosted by an AI model service, such as AI model service 690 described herein with reference to FIG. 6, and accessed by each or any of components 110, 114, 124, 126, 132 via, e.g., appropriately configured application programming interface (API) calls as described in more detail below.

A generative artificial intelligence (GAI) model or generative model uses artificial intelligence technology, e.g., neural networks, to machine-generate new digital content based on model inputs and the previously existing data with which the model has been trained. Whereas discriminative models are based on conditional probabilities $P(y|x)$, that is, the probability of an output y given an input x (e.g., is this a photo of a dog?), generative models capture joint probabilities $P(x, y)$, that is, the likelihood of x and y occurring together (e.g., given this photo of a dog and an unknown person, what is the likelihood that the person is the dog's owner, Sam?).

A generative language model is a particular type of GAI model that is capable of generating new text in response to model input. The model input includes a task description, also referred to as a prompt. The task description can include instructions and/or examples of digital content. A task description can be in the form of natural language text, such as a question or a statement, and can include non-text forms of content, such as digital imagery and/or digital audio.

Given a task description, a generative model can generate a set of task description-output pairs, where each pair contains a different output. In some implementations, the generative model assigns a score to each of the generated task description-output pairs. The output in a given task description-output pair contains text that is generated by the model itself rather than provided to the model as an input. The score associated by the model with a given task description-output pair represents a probabilistic or statistical likelihood of there being a relationship between the output and the corresponding task description in the task description-output pair. The score for a given task description-output pair is dependent upon the way the generative model has been trained and the data used to perform the model training. The generative model can sort the task description-output pairs by score and output only the pair or pairs with the top scores. For example, the generative model could discard the lower-scoring pairs and only output the top-scoring pair as its final output.

A large language model (LLM) is a type of generative language model that is trained in an unsupervised way on massive amounts of unlabeled data, such as publicly available texts extracted from the Internet, using deep learning techniques. A large language model can be configured to perform one or more natural language processing (NLP) tasks, such as generating text, classifying text, answering questions in a conversational manner, and translating text from one language to another. That is, an LLM can be used as a generative model or as a discriminative model.

A large language model includes one or more neural network-based machine learning models. In some implementations, a large language model is constructed using a neural network-based deep learning model architecture. In some implementations, the neural network-based architecture includes one or more input layers that receive model inputs, generate one or more embeddings based on the model inputs, and pass the one or more embeddings to one or more other layers of the neural network. In other implementations, the one or more embeddings are generated based on the model input by a pre-processor, the embeddings are input to the neural network model, and the neural network model generates output based on the embeddings.

In some implementations, the neural network-based machine learning model architecture includes one or more self-attention layers that allow the model to assign different weights to portions of the model input. Alternatively or in addition, the neural network architecture includes feed-forward layers and residual connections that allow the model to machine-learn complex data patterns including relationships between different portions of the model input in multiple different contexts. In some implementations, the neural network-based machine learning model architecture is constructed using a transformer-based architecture that includes self-attention layers, feed-forward layers, and residual connections between the layers. The exact number and arrangement of layers of each type as well as the hyperparameter values used to configure the model are determined based on the requirements of a particular design or implementation of the generative graph-enhanced retrieval system.

In some examples, the neural network-based machine learning model architecture includes or is based on one or more generative transformer models, one or more generative pre-trained transformer (GPT) models, one or more bidirectional encoder representations from transformers (BERT) models, one or more large language models (LLMs), one or more XLNet models, and/or one or more other natural language processing (NLP) models. In some examples, the neural network-based machine learning model architecture includes or is based on one or more predictive text neural models that can receive text input and generate one or more outputs based on processing the text with one or more neural network models. Examples of predictive neural models include, but are not limited to, GPT, BERT, and/or Recurrent Neural Networks (RNNs). In some examples, one or more types of neural network-based machine learning model architectures include or are based on one or more multi-modal neural networks capable of outputting different modalities (e.g., text, image, sound, etc.) separately and/or in combination based on textual input. Accordingly, in some examples, a multimodal neural network implemented in the generative graph-enhanced retrieval system is capable of outputting digital content that includes a combination of two or more of text, images, video or audio.

In some implementations, a large language model is trained on a large dataset of digital content such as natural language text, images, videos, audio files, or multi-modal data sets. For example, training samples of digital content such as natural language text extracted from publicly available data sources are used to train one or more generative models used by the generative graph-enhanced retrieval system. The size and composition of the datasets used to train one or more models used by the generative graph-enhanced retrieval system can vary according to the requirements of a particular design or implementation of the generative graph-enhanced retrieval system. In some implementations, one or more of the datasets used to train one or more models used by the generative graph-enhanced retrieval system includes hundreds of thousands to millions or more different training samples.

In some embodiments, one or more models used by the generative graph-enhanced retrieval system include multiple generative models trained on differently sized datasets. For example, a generative graph-enhanced retrieval system can include a comprehensive but low capacity generative model that is trained on a large data set, and the same generative model also can include a less comprehensive but high capacity model that is trained on a smaller data set, where the high capacity model is used to generate outputs based on examples obtained from the low capacity model. In some implementations, reinforcement learning is used to further improve the output of one or more models used by the generative graph-enhanced retrieval system. In reinforcement learning, ground-truth examples of desired model output are paired with respective inputs, and these input-example output pairs are used to train or fine tune one or more models.

Large language models have technical challenges including hallucination and latency. In artificial intelligence, a hallucination is often defined as model output, e.g., generated content, that diverges from the model input, e.g., is nonsensical, incorrect, or unrelated to the provided input. If the model input is not clearly defined or is repetitive, the risk of AI hallucination increases. Additionally, large language models consume large amounts of computing resources and as such can introduce nontrivial amounts of latency into the information retrieval pipeline. As a result of these and other concerns, it is a technical challenge to incorporate the use of LLMs and/or other GAI models into the operational flows of an information retrieval system while mitigating the risks of, e.g., AI hallucination and latency.

Another technical challenge is how to reduce the burden of user input when processing and executing queries; for example, how to reduce the need for the user to revise their query. Yet another technical challenge is how to scale a GAI-based retrieval system to a large number of users (e.g., hundreds of thousands to millions or more users of an Internet-based information retrieval system) without needing to increase the size of the system linearly. An additional technical challenge is how to configure a GAI-based retrieval system efficiently over a variety of user devices, e.g., adapting the inputs to and outputs of the GAI-based system to different applications and/or to different form factors of user devices, e.g., different sizes of display screens, different device types, different operating systems, etc.

To address these and other technical challenges, embodiments of the disclosed technologies provide the GAI model with instructions (e.g., statements, questions, examples, conditions, and/or constraints) that are tailored to cause the GAI model to perform a specific task based on a specific set of inputs.

Alternatively or in addition, embodiments dynamically manage communications with the one or more GAI models to address latency and/or other performance issues associated with a computing system or network. For example, the disclosed technologies may use the GAI model selectively only to perform selected tasks, and may use other types of models to perform certain tasks when the latency or hallucination risk associated with the GAI model is high.

Certain aspects of the disclosed technologies are described in the context of generative artificial intelligence models that receive text input and output text. However, the disclosed technologies are not limited to generative models that receive text input and produce text output. For example, aspects of the disclosed technologies can be used to receive input and/or generate output that includes non-text forms of content, such as digital imagery, videos, multimedia, audio, hyperlinks, and/or platform-independent file formats.

Prompt as used herein may refer to one or more instructions that are readable by a GAI model, along with the input to which the GAI model is to apply the instructions, and a set of parameter values that constrain the operations of the GAI model during the processing of the prompt and generating and outputting a response to the prompt. The input can include user input and/or other data. The input can be specified explicitly in the prompt or as a reference that is processed at execution time. The instructions can include one or more statements, questions, conditions, constraints, or examples. The examples can include examples of the types of output to be produced by the GAI model and/or examples of the types of processing steps the large language model is to perform in order to generate output. The parameter values contained in the prompt can be specified by the GAI model and may be adjustable in accordance with the requirements of a particular design or implementation. Examples of parameter values include the maximum length or size of the prompt and the temperature, or degree to which the model produces deterministic output versus random output. The way in which the elements of the prompt are organized and the phrasing used to articulate the prompt elements can significantly affect the output produced by the GAI model in response to the prompt. For example, a small change in the prompt content or structure can cause the GAI model to generate a very different output.

The examples shown in FIG. 1A and the accompanying description above are provided for illustration purposes. This disclosure is not limited to the described examples. Additional or alternative details and implementations are described herein.

In some embodiments, depictions shown in the flow shown in FIG. 1A are presented to the user 102 via application 105, prior to the response 134. For example, in some embodiments, portions of the reasoning process including the query intent 116, entity 118, intra-document graph 122, graph query 128, and path 130 are displayed via application 105 in a manner that enables the user 102 to view and interact with the display of the query intent 116, entity 118, intra-document graph 122, graph query 128, and/or path 130. For example, the generative graph-enhanced information retrieval system can receive one or more signals via application 105 and/or device 104 and, in response to the one or more signals, expand any one or more of the query intent 116, entity 118, intra-document graph 122, graph query 128, or path 130 to show more details or modify any one or more of the query intent, entity 118, intra-document graph 122, graph query 128, and path 130 based on the received one or more signals, either subsequent to or prior to generation of the response 134. Examples of signals include interactions with one or more portions of the display of a query intent, entity, graph, graph query, or path.

While FIG. 1A illustrates an example in which the path 130 is contained within a single intra-document graph 122, in other examples, the path generated by the graph query generation and path extraction component 126 can include one or more inter-document links such that the path extends across multiple different intra-document graphs of the graph 120. An example of such a path is shown in the visualization of FIG. 1B.

Figure 1B:
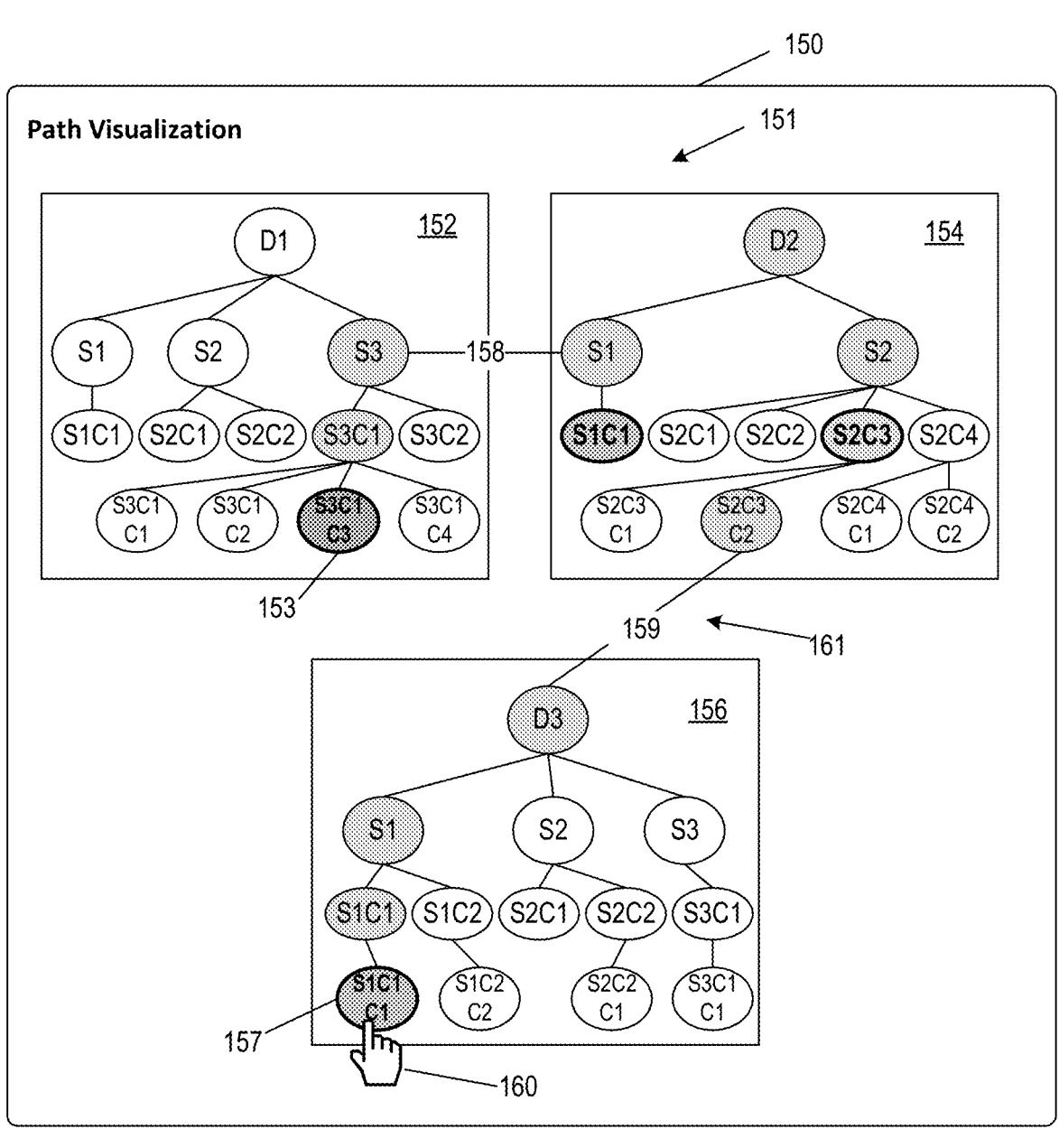
FIG. 1B is a schematic diagram that illustrates an example of a visualization of a graph including intra-document graphs and inter-document edges, which may be created, displayed via a user interface, and used for generative graph-enhanced information retrieval using components of a generative graph-enhanced information retrieval system in accordance with some embodiments of the present disclosure.

FIG. 1B is a schematic diagram that illustrates an example of a visualization of a graph that may be created, displayed via a user interface, and used for generative graph-enhanced information retrieval using components of a generative graph-enhanced information retrieval system in accordance with some embodiments of the present disclosure.

In the illustrative example of FIG. 1B, a path visualization 150 is a graphical depiction of a subgraph 151 of the graph 120. The path visualization 150 is interactively presented at a device, e.g., device 104, via application 105. The subgraph 151 has been identified in response to a different query than query 106 or in response to a modified version of the query 106. The subgraph 151 includes portions of multiple different intra-document graphs 152, 154, 156, of the graph 120. The intra-document graphs 152, 154, 156 each include intra-document edges. A path 161 is identified and visualized in the subgraph 151. The path 161 includes a first node 157, a second node 153, and intermediate nodes and edges connecting the first node 157 and the second node 153. The path 161 includes both intra-document edges and inter-document edges 158 and 159.

In the example of FIG. 1B, the generative graph-enhanced information retrieval system determines that the pieces of content that are most relevant and responsive to the subject query are dispersed across multiple different documents. To make this determination, the embedding-based retrieval component 124 may have identified node embeddings associated with each of documents D1, D2, and D3 as matching one or more embeddings associated with the subject query. For example, using embedding-based retrieval, each of nodes D3S1C1C1, D2S1C1, and D2S2C3 are identified via embedding-based retrieval as having corresponding embeddings that most closely match an embedding associated with the query, with the embedding associated with node 157 most closely matching the embedding associated with the query. For case of discussion, an embedding of document content associated with a node may be referred to as a node embedding, and an embedding of a portion of a query may be referred to as a query embedding or an entity embedding.

Various portions of the path visualization 150 are implemented as interactive graphical user interface controls. As illustrated by element 160, each node and edge of the subgraph 151 is implemented as an interactive control such that selecting (e.g., clicking or tapping on) a node or edge causes the path visualization 150 to display details about the selected node or link, such as information about a node or its schema, or weights and labels associated with an edge. For instance, navigating element 160 over a node or an edge causes additional information about the node or edge to be displayed. Alternatively or in addition, selecting a node or edge via, e.g., element 160, enables one or more properties of the node or edge to be modified and/or enables the node or edge to be added to or removed from the path 161. In some embodiments, a graph database management system, such as NEO4J, is used to generate, display, and manipulate the graphs, paths, and graph queries described herein.

The examples shown in FIG. 1B and the accompanying description, above are provided for illustration purposes. This disclosure is not limited to the described examples. Additional or alternative details and implementations are described herein.

FIG. 1C and FIG. 1D illustrate examples of interactions involving a user interface for information retrieval, including visualizations of requests for information, graphs, reasoning, and answers, which may be generated and displayed using components of a generative graph-enhanced information retrieval system in accordance with some embodiments of the present disclosure.

In the illustrative example of FIG. 1C and FIG. 1D, a user interface flow 164, 178 is implemented via a search assistant 179. Search assistant 179 is, for example, a component of application 105 described above. In the first portion of the user interface flow 164, shown in FIG. 1C, a query 168 is input via a search mechanism 167. In response to the query 168, the illustrated embodiment of the generative graph-enhanced information retrieval system generates and presents elements 170, 172, 176 via a window mechanism 169, using the technologies described herein. For example, the generative graph-enhanced information retrieval system parses the query 168 to identify first and second query portions, converts the first and second query portions to entities (e.g., an intent and an entity), identifies a subgraph 170 of a graph of a document set (e.g., graph 120) based on an embedding of the second query portion matching an embedding of document content associated with a first node of the subgraph 170 (e.g., node D1S3C1C1, executes a graph query to identify a second node of the subgraph 170 based on the first query portion (e.g., node D1S1C1), identifies a path 171 connecting the first node with the second node, and displays the subgraph 170 including the path 171. The display of the subgraph 170 including the path can be interactive in a similar manner as described above with reference to FIG. 1B, e.g., nodes and edges of the subgraph 170 and/or path 171 can be implemented as graphical controls.

In the flow 164, the illustrated embodiment of the generative graph-enhanced information retrieval system generates and outputs reasoning 172. Reasoning 172 includes a natural language explanation of the process by which the generative graph-enhanced information retrieval system identified the path 171. Reasoning 172 includes a description of how the query 168 was parsed, how the subgraph 170 was identified, and the graph query used to identify the path 171. Reasoning 172 is machine-generated using the approaches described herein; e.g., via a generative artificial intelligence model.

In relation to the window 172, a control mechanism 174 can receive a signal. The signal can be a result of a user input, such as an interaction with a user interface presentation of a graph and/or path as described herein, and/or generated automatically by the generative graph-enhanced information retrieval system. Based on receipt of a signal via control mechanism 174, the generative graph-enhanced information retrieval system can determine to proceed with generating and outputting an answer 176. The answer 176 includes a natural language description that is responsive to the intent of the query 168. The answer 176 is machine-generated using the approaches described herein; e.g., via a generative artificial intelligence model.

For example, if a signal is received via control mechanism 174, the generative graph-enhanced information retrieval system interprets the signal as an approval of the subgraph 170, path 171, and associated reasoning 172. If a signal is not received via control mechanism 174 and a new or revised query is input via search mechanism 167, then the generative graph-enhanced information retrieval system interprets the combination of the lack of a signal and/or the new or revised query as a disapproval of the subgraph 170, path 171, and/or associated reasoning 172, or as an indication that one or more of the subgraph 170, path 171, and/or associated reasoning needs revision or fine tuning.

While control mechanism 174 is shown in FIG. 1C in spatial relation to reasoning window 172, control mechanism 174 can be positioned in spatial relation to any portion of the flow 164. For example, the generative graph-enhanced information retrieval system can generate and output all of subgraph 170, path 171, reasoning 172, and answer 176, and position the control mechanism 174 near the bottom of the window 169, e.g., adjacent to answer 178. Alternatively, the generative graph-enhanced information retrieval system can generate and output subgraph 170, path 171, reasoning 172, and answer 176 in a step-wise fashion with a control mechanism 174 presented in relation to each step. For instance, the generative graph-enhanced information retrieval system can generate and output subgraph 170, present a control mechanism 174 to prompt the user to approve, reject, or modify the subgraph 170, then if the subgraph 170 is approved (or not rejected or modified), proceed to generate and output the path 171 and the reasoning 172, then present a control mechanism 174 to prompt the user to approve, reject, or modify the path 171 and/or the reasoning 172, then if the path 171 and the reasoning 172 are approved (or not rejected or modified), proceed to generate and output the answer 176.

FIG. 1D illustrates a second portion of the user interface flow 178. The second portion of the flow 178 is presented via a new or refreshed screen 179 of the search assistant 166. In the new or refreshed screen 179, the search mechanism 167 receives a second query 182. The second query 182 relates to the query 168 and includes a follow-up question, which is interpreted as a new intent ("product impact"). The generative graph-enhanced information retrieval system interprets the second query 182 in a similar way as described above with respect to the query 168, and generates and outputs subgraph 184, path 185, reasoning 186, and answer 190, in a similar manner as subgraph 170, path 171, reasoning 172, and answer 176. As shown in FIG. 1D, based on the new intent extracted from the second query 182, the node S2C2 is added to the path 171 to create the path 185, the reasoning 172 is revised to include a description of the new intent, the graph query is updated to incorporate a search for the new intent, and the answer is updated to include content that is responsive to the new intent.

The examples shown in FIG. 1C and FIG. 1D, and the accompanying description, above are provided for illustration purposes. This disclosure is not limited to the described examples. Additional or alternative details and implementations are described herein.

FIG. 2 is a schematic diagram of an example of conversion process 200 between a document and a graph representative of the document, which may be created and used for generative graph-enhanced information retrieval using components of a generative graph-enhanced information retrieval system in accordance with some embodiments of the present disclosure.

In FIG. 2, a graph template including canonical or standardized elements 209 is used to convert a document 202 into a corresponding intra-document graph 204 and to create an inter-document edge 212 connecting the intra-document graph 204 with an intra-document graph 208 of another document (not shown). The graph template defines a structure that the described graphing mechanism (e.g., graph-based parsing component 506, described below with reference to FIG. 5) uses to perform the document to graph conversion process. The graph template includes canonical elements 209, such as keys and entities. For instance, one or more keys are used to uniquely identify intra-document graphs and link them with corresponding documents, and to uniquely identify nodes of a graph and link them with corresponding document portions. For example, a key can include a unique document identifier, a unique node identifier, and/or a node type, where the node type corresponds to a canonical entity of a set of canonical entities.

The graph template includes canonical entities and edges that indicate canonical relationships between entities. The canonical entities and edges are defined based on the requirements or design of a particular implementation. The canonical entities may include labels that identify particular sections of a particular type of document or particular categories of content. For example, in the issue tracking domain, a representative document may be an issue ticket and the canonical entities included in the graph template may include "issue summary," "symptom description," "expected result," "actual result," "steps to reproduce the issue," and "related issues."

The canonical edges (relationships between entities in the graph template) can indicate hierarchical dependencies between or among the canonical entities. The canonical edges can be derived from an expected document structure. For example, paragraph symbols, punctuation marks, and/or indentations in the issue ticket can indicate that "expected result" and "actual result" are two different entities that are associated with the "symptom description" entity, such that in the graph template, the "expected result" and "actual result" nodes are both connected to the "symptom description" node by respective edges.

The canonical edges can also or alternatively indicate different types of relationships between nodes; that is, each edge can be assigned an edge type or label that identifies the specific type of relationship between the nodes that are connected by the edge. As such, a pair of nodes can be connected by multiple edges, where each edge is of a different type.

In the example of FIG. 2, the unique document identifier is used as a key that is assigned to the root node 205 of the intra-document graph 204. Different portions of the content within the document 202 are mapped to different nodes of the intra-document graph 204 based on the applicable graph template. For example, a mapping 210 maps the content of subsection 2.1 of the document 202 to a set of nodes 207 of the intra-document graph 204, where the set of nodes 207 have a second-degree relationship with the root node 205. Relationships between nodes are indicated by intra-document edges such as edge 206. Inter-document edge 212 is created because, for example, section N of document 202 contains an implicit or explicit reference to a different document, i.e., the document represented by the intra-document graph 208. An example of an explicit reference is text of the document that identifies another document by that other document's identifier. An example of an implicit reference is a reference that is created via computational inferencing, e.g., by a natural language processing (NLP) component that identifies documents that contain similar content. The graph representation 204 of the document 202, including intra-document edges such as edge 206 and inter-document edges such as edge 212, facilitates information retrieval particularly when relevant pieces of content are not all contained within the same section of a document or are dispersed across multiple documents.

Additional details regarding the method by which the document to graph conversion process 200 can be implemented are described below with reference to FIG. 5.

The examples shown in FIG. 2 and the accompanying description, above are provided for illustration purposes.

This disclosure is not limited to the described examples. Additional or alternative details and implementations are described herein.

Figure 3:
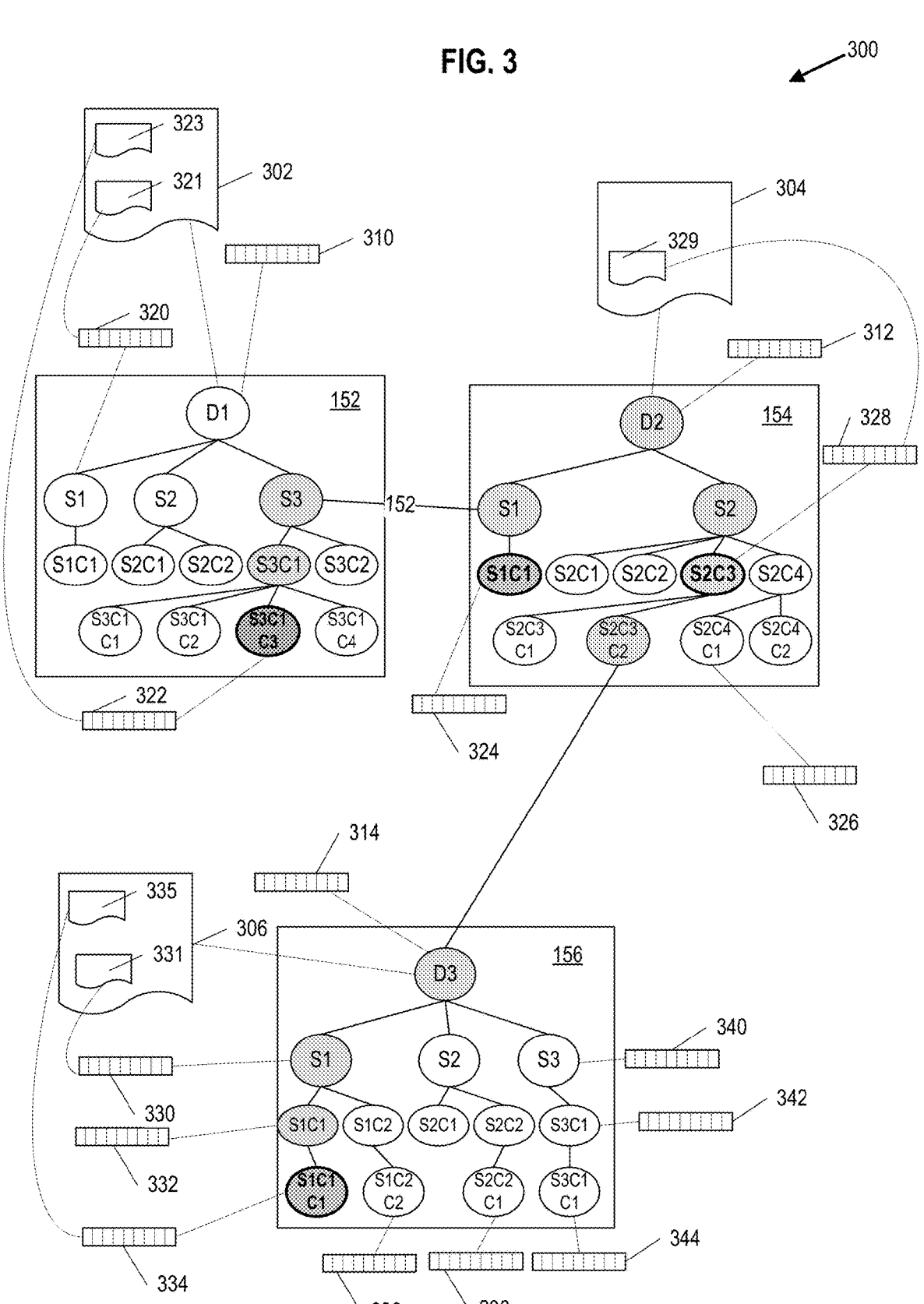
FIG. 3 is a schematic diagram of an example of intra-document graphs, embeddings associated with nodes of the intra-document graphs, and document content associated with nodes and embeddings, which may be created and used for generative graph-enhanced information retrieval using components of a generative graph-enhanced information retrieval system in accordance with some embodiments of the present disclosure.

FIG. 3 is a schematic diagram of an example of intra-document graphs, embeddings associated with nodes of the intra-document graphs, and document content associated with nodes and embeddings, which may be created and used for generative graph-enhanced information retrieval using components of a generative graph-enhanced information retrieval system in accordance with some embodiments of the present disclosure.

In FIG. 3, a knowledge base generation process, such as the process described below with reference to FIG. 5, creates a knowledge base 300. The knowledge base includes a set of documents that includes documents 302, 304, 306. Each document in the document dataset includes one or more document portions. For example, document 302 includes at least document portions 321, 323; document 304 includes at least document portion 329, and document 306 includes at least documents 331, 335.

The knowledge base generation process parses each document 302, 304, 306 into a corresponding intra-document graph (e.g., a tree-structure graph), where each node of the respective intra-document graph contains or is associated with a specific piece of information contained within the corresponding document, all of the information contained within the document is represented in the corresponding intra-document graph, and the root node of the intra-document graph includes a key that corresponds to the unique document identifier for the corresponding document. As described above, the structure of the intra-document graph can be defined by a graph template. Alternatively, the structure can be machine-learned. For example, a common graph structure can be derived from the individual intra-document graphs of the documents in the document set.

In the example of FIG. 3, knowledge base generation process creates a graph representation of the contents of document 302 as intra-document graph 152 including a root node that contains the document-identifying key D1. Each node of the intra-document graph represents a portion of content of the document and can be uniquely identified by a combination of keys. For example, node S1 of graph 152 can be uniquely identified by the key D1S1 and nod S3C1 can be uniquely identified by the key D1S3C1.

Similarly, the process creates a graph representation of the contents of document 304 as intra-document graph 154, with a root node that contains the key D2 and intra-document nodes each representing a content portion of the document, and creates a graph representation of the contents of document 306 as intra-document graph 156 with a root node that contains the key D3 and intra-document nodes each representing a content portion of the document. The example of FIG. 3 includes three documents for illustrative purposes only; the knowledge base generation process can operate on a dataset containing any number of documents.

The knowledge base generation process further creates inter-document edges between or among intra-document graphs, such as inter-document edge 158. As noted above, the inter-document edges can represent explicit connections between documents or implicit connections between documents. An explicit connection is constructed if, for example, a document D1 contains a specific reference to another document, e.g., "document D5 has a similar solution as this document." In this example, an edge is created linking the root node of document D5 with the root node of document D1, and the edge between document D5 and D1 is labeled "similar solution." An implicit connection is constructed if, for example, a similarity between documents or document nodes is machine learned.

The knowledge base generation process further creates embeddings of the document content portions at the node level. Illustrative examples of embeddings shown in FIG. 3 include embeddings 310, 312, 320, 322, 324, 326, 328, 330, 332, 334, 336, 338, 340, 342. For example, an embedding 320 is created for content portion 321 of document 302 and the embedding 320 is associated with the graph node that corresponds to the content portion 321, e.g., node D1S1.

A graph database is used to store the graph topology structure for each of the intra-document graphs 152, 154, 156 as well as the inter-document edges. The topology structure contains the nodes and edges, and each node and edge is uniquely identifiable by a key. Using the issue ticket example, a non-root node of the graph could represent the "issue description" section of the document. In some embodiments, the document content associated with a given non-root node is also stored in the graph database. For instance, using a key-value store implementation, the document content can be stored as the value associated with the node key.

In some implementations, the node level embeddings are not stored in the graph database but are stored in a separate embedding database (also referred to as a vector database, embedding store, or vector store). The embedding database stores the embedding for each node. To map the node level embeddings to the corresponding graph node, the key associated with the node is also stored in the embedding database. In some implementations, the embedding database includes a field for storage of one or more filters. The one or more filters can be predefined filters that map to, e.g., entities or entity types. Storing the applicable filters in the embedding database can be effective for reducing the computational effort required during embedding-based retrieval (EBR).

An example of a database schema design for the knowledge base is shown in Table 1.

As shown in Table 1, a unique node-level key links nodes of the graph database with corresponding embeddings stored in the embedding database, where the corresponding embedding is of the portion of document associated with the respective node.

Examples of node schemas for nodes of the graph database are shown in Table 2 and Table 3, using the issue tracking use case for illustration. Table 2 shows an example of a root node, and Table 3 shows an example of a non-root (e.g., intermediate or leaf) node.

TABLE 2

| Example of root node schema. | |
| --- | --- |
| Node label | Issue Ticket |
| Node Identifier | 558 |
| Document ID Key | D1 |
| Type | Document |

As shown in Table 2, the schema for the non-leaf node includes a node label, node-specific identifier, key, and node type. The identifier, key, and/or node type can be used to map the node to a corresponding record in the embedding database.

TABLE 3

| Example of non-root node schema. | |
| --- | --- |
| Node label | Issue Description |
| Node Identifier | 560 |
| Document ID Key | D1 |
| Type | Issue Description |
| Value | "database failure when updating dashboard" |

As shown in Table 3, the schema for the non-root node includes a node label, node identifier, document ID key,

TABLE 1

| Example schema design for the knowledge base. | | |
| --- | --- | --- |
| Aspect | Graph Database | Embedding Database |
| Document Content | Graph Structure:<br>Nodes represent portions of content that map to entities. Each node contains a node-identifying key, such as the document identifier, the node identifier, and node type. Edges between nodes represent relationships between entities (or the corresponding portion of content) | A database record includes the following fields:<br>Document identifier<br>Node identifier<br>Node type<br>Node-level content<br>Filter<br>Embedding |
| Schema | Non-Leaf (e.g., Root) Nodes:<br>Node key (e.g., document identifier)<br>Node type<br>Non-Root (e.g., Intermediate or Leaf Nodes):<br>Node key (e.g., document identifier + node identifier)<br>Node type<br>Node value (e.g., the portion of content associated with the node) | Document key (or node key, used to map to graph nodes)<br>Node type<br>Value (e.g., content associated with the node, optionally reproduced from the value field of the graph database)<br>Filter (e.g., node type or entity, to expedite searching during EBR)<br>Embedding vector |
| Linkage between graph database and embedding database | Unique key includes a combination of document key (or node key) and node type. | | node type, and value. The node label corresponds to an entity extracted from the associated document (e.g., the name of a section of the issue ticket). The node identifier uniquely identifies the node in relation to other nodes. The document identifier key identifies the root node (and corresponding document) with which the non-root node is associated. The type indicates the node type, which, in this case, corresponds to the entity extracted from the associated document. The value indicates the portion of document content associated with the node. The node identifier, document identifier key, and/or node type can be used to map the node to a corresponding record in the embedding database.

Using the issue tracking use case for illustration, Table 4 shows an example of an embedding database schema.

TABLE 4

Example of embedding database schema.

| Document ID | Node Type | Content Value | Filter Name, Filter Value | Embedding Vector |
|---|---|---|---|---|
| D1 | Issue Description | "failed logging..." | Category, Job Search | [1.20, 2.81, . . . ] |
| D1 | Summary | "could not validate..." | Category, Job Search; | [1.23, 2.34, . . . ] |
| D2 | Issue Description | "can't open website..." | Category, Learning | [2.31, −1.03, . . . ] |
| D2 | Summary | "upload error" | Category, Network | [−1.23, 3.21, . . . ] |

In the example of Table 4, a single document (e.g., one issue ticket) is represented as multiple rows in the embedding database. That is, each row of the illustrated embedding database corresponds to a different root node-non-root node combination (and thus, a different document-portion of document content combination). The filter column can contain more than one filter; that is, multiple filters can be assigned to a single node, where, for example, each filter is identified by its name (or identifier) and value.

Path generation is performed at query time. For example, at query time, the generative graph-enhanced retrieval system may extract a subgraph from the overall graph of the document set, where the subgraph includes, e.g., the intra-document graphs 152, 154, 156 shown in FIG. 3, and associated inter-document edges. Using the extracted subgraph, the at query time, the generative graph-enhanced retrieval system identifies a path that corresponds to the query (e.g., nodes D3S1C1C1, D1S3C1C3, and intermediate nodes and edges connecting the nodes D3S1C1C1 and D1S3C1C3. In some instances, multiple different paths are generated. For example, if the path includes one or more inter-document links, multiple paths can be generated. In such instances, the system can return each of the different graphs and allow the user to review and interact with each of the graphs. Alternatively, the system can compute a score for each of the graphs (e.g., a calculation based on the length of the path in terms of the number of nodes and edges included in the path), rank the paths based on the scores, and return the highest scoring paths. An example of an online query interpretation and information retrieval process is shown in FIG. 4, described below.

The examples shown in FIG. 3 and the accompanying description, above are provided for illustration purposes. This disclosure is not limited to the described examples. Additional or alternative details and implementations are described herein.

Figure 4:
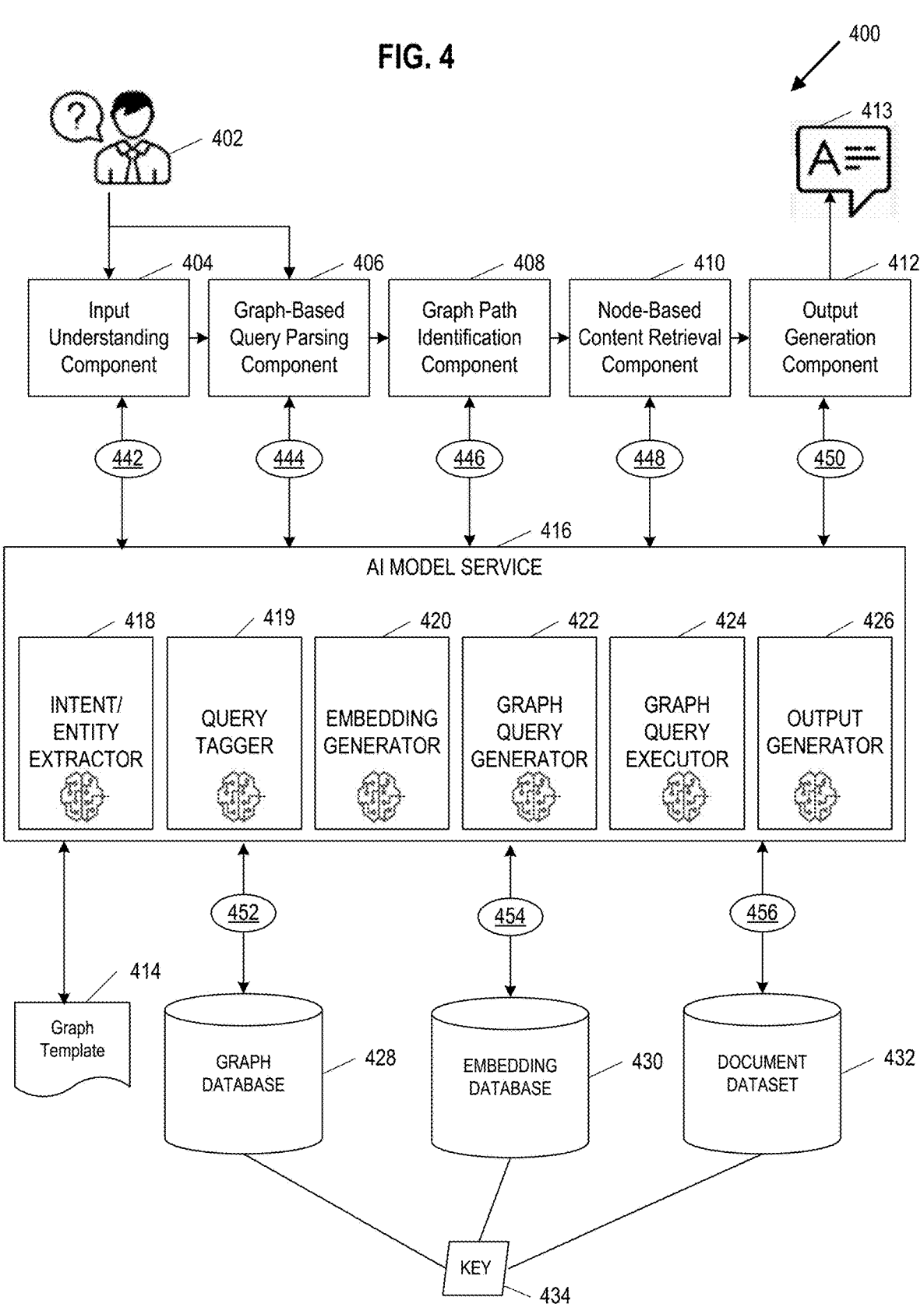
FIG. 4 is a flow diagram of an example method for generative graph-enhanced information retrieval using components of a generative graph-enhanced information retrieval system in accordance with some embodiments of the present disclosure.

FIG. 4 is a flow diagram of an example method 400 for generative graph-enhanced information retrieval using components of a generative graph-enhanced information retrieval system in accordance with some embodiments of the present disclosure.

In FIG. 4, an online query interpretation and information retrieval pipeline 400 is initiated by a query, such as a query input at an electronic device by a user 402 and produces a response 413. The online query interpretation and information retrieval pipeline 400 includes an input understanding component 404, a graph-based query parsing component 406, a graph path identification component 408, a node-based retrieval component 410, and an output generation component 412. At query time, each or any of the components 404, 406, 408, 410, 412 communicates bidirectionally with one or more components of an AI model service 416, such as an intent/entity extractor 418, a query tagger 419, an embedding generator 420, a graph query generator 422, a query executor 424, and an output generator 426. The AI model service 416 includes and enables access to one or more artificial intelligence or machine learning models, as described in more detail below. For example, one or more of intent/entity extractor 418, query tagger 419, embedding generator 420, graph query generator 422, query executor 424, and output generator 426 can include or reference the same AI model or different models. For instance, intent/entity extractor 418, query tagger 419, graph query generator 422, and output generator 426 can all interact with the same AI model but in different ways, as described below.

The one or more models provided as a service by AI model service 416 can communicate bidirectionally with each or any of graph database 428, embedding database 430, and document dataset 432, via corresponding communications 452, 454, 456. Any of communications 442, 444, 446, 448, 450, 452, 454, 456 may be implemented using, e.g., API calls, HTTP requests, or similar mechanisms. The AI model service 416 can be implemented as a single service or platform, or as multiple services. For example, different types or versions of artificial intelligence models may be made available by different AI model services.

At query time, the input understanding component 404 identifies portions of the query that correspond to canonical intents and/or entities via bidirectional communications 442 with AI model service 416, e.g., with intent/entity extractor 418. The input understanding component 404 uses the associated canonical intents and/or entities received from intent/entity extractor 418 to identify portions of a graph of a document dataset (stored, e.g., in graph database 428) that are most relevant to the query. Using the example of FIG. 1A, the input understanding component 404, via communications 442 with intent/entity extractor 418, identifies query portions 108, 112 as corresponding to canonical intents/ entities.

In more detail, canonical intents and/or entities include structured representations of document content in the sense that the intent label or entity label is standardized and assigned a certain predefined meaning. In some embodiments, the bidirectional communications 442 include the input understanding component 404 passing the query to a large language model with an instruction that causes the large language model to function as intent/entity extractor 418. That is, the instruction is or is included in a prompt that is configured for input to the large language model. The query is passed to the large language model along with the instruction, e.g., as an argument of the prompt. In some embodiments, the prompt also includes or references a predefined template, such as graph template 414. For example, the graph template 414 can be implemented in YAML and referenced in the prompt. In some embodiments, the prompt is configured to cause the intent/entity extractor 418 (e.g., the large language model functioning as an intent/entity extractor) to perform few-shot in-context learning.

An example of a prompt configured to cause a large language model to function as intent/entity extractor 418 is shown in Table 5.

TABLE 5

Example prompt for input understanding.

<|im_start|>
Extract an intent of user question. Provide the result string, the string should be one of the fields from YAML Template key.
<|im_end|>
<|im_start|>Adhere to the specified YAML template and its description. Identify the user's intent from the question and map it to the corresponding field in the YAML template.
***YAML Template and description of each field**
{yaml_graph_template}
**Example Question and Answer***
1. Question: How can one replicate the issue where <issue description>? Answer: Reproduction steps.
2. Question: How can the 'can't login' error be reproduced? Answer: Steps to Reproduce
3. Question: What's the anticipated outcome for the error where a user can't login? Answer: Expected Result
4. Question: What led to the situation where the user couldn't login?
Answer: Root Cause
**Question***
{question}
****Return the string from YAML template.

As shown in Table 5, the illustrative input understanding prompt contains an instruction to cause a large language model to function as an intent/entity extractor 418. The illustrated prompt also includes a number of examples and other instructions that are designed to constrain the large language model's processing of the input query based on a template and to avoid AI hallucination. In some implementations, the output provided by the intent/entity extractor 418 (e.g., the large language model) is in the form of key-value pairs, e.g., Map (entity_name→entity_value) where the identified value is an intent selected from the canonical set of intents. The prompt examples provided herein may be configured for communication to a specific type of language model, e.g., a GPT-based model, but are not limited to such implementations and can be adapted for use with other large language models.

The graph-based query parsing component 406 tags the query based on the intents and/or entities identified by the input understanding component 404. Using the example of FIG. 1A, the graph-based query parsing component 406 could tag the query portion 108 ("how to reproduce") with the canonical query intent label STEPS_TO_REPRODUCE. Similarly, the graph-based query parsing component 406could tag the query portion 112 ("admin sees several errors . . . ") with the canonical entity label ISSUE_DE-SCRIPTION.

In more detail, some embodiments of graph-based query parsing component 406 communicate bidirectionally with AI model service 416, e.g., a large language model operating as query tagger 419, via communications 444, to generate a tagged version of the query based on the intents and/or entities identified by the large language model operating as intent/entity extractor 418. For example, communications 444 can include embodiments of graph-based query parsing component 406 passing the query and the identified intents and/or entities to the large language model with an instruction to cause the large language model to function as a query tagging component.

An example of a prompt configured to cause a large language model to function as query tagger 419 is shown in Table 6.

TABLE 6

Example prompt for query tagging.

<|im_start|> Extract a minimal subset of the YAML structure pertaining to question answering.
Provide the result in a dictionary, where the key represents the relevant template field at its most granular level, and the value captures the content from the user's question.
<|im_end|>
<|im_start|> Adhere to the specified template and its description. Interpret the query and present the outcome as a dictionary. The key should be the most granular field name from the YAML template, and the value should represent the content extracted from the query.
***YAML Template and description of each field **
{yaml_graph_template}
**Example Question and Answer***
1. Question: How can one replicate the issue where a user can't login?
Answer: {{"Issue Description": "a user can't login", "Steps to Reproduce": "USER_QUESTION_INTENT"}}
2. Question: How can the '<issue_description> be reproduced?
Answer: {{"Issue Description": "can't login", "Steps to Reproduce": "USER_QUESTION_INTENT"}}
3. Question: What's the anticipated outcome for the error where a user can't login?
Answer: {{"Issue Description": "user can't login", "Expected Result":

TABLE 6-continued

Example prompt for query tagging.

"USER_QUESTION_INTENT"}}
**Question***
{question}
****Please extract only the subset of the YAML structure that can answer the question.
Return result in a Dictionary with key equal to the related YAML template field name at
lowest level, and value is the parsed content from the query.
Please only return the relevant subset instead of all fields.
****

As shown in Table 6, the illustrative query tagging prompt is configured using few-shot learning. The illustrative query tagging prompt contains an instruction to cause a large language model to function as a query tagger 419. The illustrated prompt also includes a number of examples and other instructions that are designed to constrain the large language model's processing of the input based on a template and to avoid AI hallucination.

In some embodiments, intent/entity extractor 418 and query tagger 419 are implemented as a single component that both identifies intents and/or entities and tags the query accordingly. A potential advantage of separating these functions into two components is that different AI models may be used; for example, based on desired latency, computational complexity, network availability, or other operational considerations, it may be beneficial to use different models for intent/entity identification and query tagging.

The graph path identification component 408 uses the output of the input understanding component 404 and the graph-based query parsing component 406 to generate a path through the graph of the document dataset. The path includes the intent and/or entities identified by the input understanding component 404 and the graph-based query parsing component 406. Using the example of FIG. 1A, the path includes a node that corresponds to the query intent 116, a node that corresponds to the entity 118, and at least one edge connecting the query intent node with the entity node.

In more detail, graph path identification component 408 uses the tagged query generated by graph-based query parsing component to identify one or more nodes or subgraphs of the overall graph of the document dataset that are related to the tagged query. For example, graph path identification component 408 identifies one or more nodes of the graph that correspond to one or more entities of the tagged query and then based on the identified nodes and the identified intent, graph path identification component 408 identifies the subgraphs (e.g., one or more intra-document graphs) that contain relevant information for generating a response to the query.

In some embodiments, graph path identification component 408 performs two steps, which involve bidirectional communications with embedding generator 420 and graph query generator 422. First, graph path identification component 408 communicates with embedding generator 420 to generate embeddings for the one or more entities extracted from the query via intent/entity extractor 418, and then queries embedding database 430 using embedding-based retrieval to identify matching node-level embeddings associated with nodes of the overall graph of the document dataset, such that the matching of the query entity embeddings to node-level embeddings of the graph can be used to identify the most relevant subgraph(s) of the overall document dataset graph, in relation to the to query. In some embodiments, embedding generator 420 is implemented using a BERT model; however, other forms of embedding generators can be used, including one or more large language models such as GPT.

Keys 434, which link nodes of the graph to corresponding node-level embeddings and to the corresponding portions of document content, are used to map embeddings to associated nodes and/or nodes to associated content. In the case where multiple matching node-level embeddings are identified, the nodes can be ranked based on similarity (e.g., by computing a cosine similarity between the node-level embedding and the query entity embedding) and then the top k nodes selected, where k is a positive integer. Alternatively or in addition, the matching nodes can be filtered based on co-occurrence (e.g., distance in terms of number of connecting edges) in the graph, such that nodes that are closer together in terms of distance/number of connecting edges are ranked higher than nodes that are separated by a larger distance in the graph. Once the matching nodes are identified, the most relevant subgraphs (e.g., intra-document graphs) are identified, e.g., as those subgraphs that include one or more of the matching nodes.

Once the most relevant graph nodes and subgraphs are identified by embedding-based retrieval, the graph path identification component 408 communicates with graph query generator 422 and graph query executor 424 to generate a graph query based on the query intent identified by intent/entity extractor 418 and the nodes and/or subgraph(s) identified via embedding-based retrieval, and then executes the graph query on the identified subgraphs to determine a path that includes nodes that correspond to at least the query intent and one or more of the query entities. In some embodiments, graph path identification component 408 passes the identified nodes and the identified query intent to the large language model with an instruction to generate a graph query, receives the graph query from the large language model, and execute the graph query generated by the large language model on the identified subgraph(s) using the graph querying mechanism of the graph database management system 428. In some embodiments, graph query generation and execution are executed as a single step path extraction process. In other embodiments, graph query generation and execution are executed in an iterative process in which the large language model generates a graph query in a language that can be executed on the identified subgraph(s) by the graph database management system 428, the graph database management system 428 executes the large language model-generated graph query and passes the resulting path back to the large language model, the large language model evaluates the path and either regenerates the graph query or passes the resulting path back to the graph path identification component 408.

Referring to the issue tracking system example described above, as an example, graph path identification component

408 can use embedding-based retrieval to identify the root node in the overall document dataset graph that most closely matches an entity extracted from the query, and then use a large language model to generate a graph query to find another node in the graph that most closely matches the intent extracted from the query, and then execute the query to find the path that includes both the entity node and the intent node.

An example of a prompt configured to cause a large language model to function as graph query generator 420 is shown in Table 7.

The node-based content retrieval component 410 uses the path generated by the graph path identification component 408 to identify and extract relevant portions of content from the document set. For example, the node-based retrieval component 410 uses keys 434 to identify the relevant portions of content based on the portions of content that are associated with at least the intent node and the entity node of the path. In some embodiments, these node-level content portions are used to formulate a prompt for input to a large language model.

TABLE 7

Example prompt for graph query generation.

```
<|im_start|>
Act like a query generator.
<|im_end|>
<|im_start|> Given the graph description below, please generate a graph query to answer the
following question.
*****Single intra-document graph Creation****
'''
{yaml_graph_structure_creation_query}
'''
note that <doc_key> is the doc key placeholder and can be different from case to case.
*****Inter-document relationship construction****
'''
MATCH (n1:Doc {{doc_key: "<doc_key_1>"}}), (n2:Doc {{doc_key: "<doc_key_2>"}})
CREATE (n1)-[:<relation_name>)]->(n2)
RETURN n1, n2;
'''
note that <doc_key_1> and <doc_key_2> are doc key placeholder and can be different from
case to case.
*****Example Question and Answer****
1. Question: What's the expected result for D1?
Answer: 'MATCH (j:Doc {{doc_key: D1'}})-[:HAS_EXPECTEDRESULT]-
>(expectedResult:ExpectedResult) RETURN expectedResult.value
****Question*****
{question}
**** return the graph query to answer this question. ****
```

As shown in Table 7, the illustrative graph query generation prompt is configured using few-shot learning. The illustrative graph query generation prompt contains an instruction to cause a large language model to function as a graph query generator 422. The illustrated prompt also includes one or more examples and other instructions that are designed to constrain the large language model's processing of the input based on a template and to avoid AI hallucination. Additionally, the illustrative graph query generation prompt includes a section with instructions for generating a query based on a single subgraph (e.g., an intra-document graph) and also includes a section with instructions for generating a query to find relationships between subgraphs.

The output generation component 412 converts the portions of content identified by the node-based retrieval component 410 as associated with the path to a format for output at a device; e.g., the electronic device by which the user 102 entered the query. In some embodiments, the output generation component 412 formulates a prompt for input to a large language model based on the portions of content identified by the node-based retrieval component 410 as associated with the path, and receives the formatted output from the large language model in response to the prompt.

An example of a prompt configured to cause a large language model to function as output generator 426 is shown in Table 8.

TABLE 8

Example prompt for output generation.

```
<|im_start|>system
Act as an issue resolution assistant. Explain the reasoning process behind answering the
query. Begin by parsing the query to determine its intent and tags. Next, employ Evidence-
Based Reasoning to identify the most relevant documents and extract nodes from the
document graph.
Following this, construct and execute a graph query.
Finally, present the answer obtained from this process. Clearly describe each step of this
reasoning process.
<|im_end|>
<|im_start|>Identify the answer to questions based on the answer retrieved from various
sources.
****** Question To Answer ******
{question}
```

TABLE 8-continued

Example prompt for output generation.

```
****** Intent Parsing ******
{intent_classification_result}
****** Query Tagging ******
{query_tagging_result}
****** Use Evidence-Based Reasoning to find top related documents for the parsing result
******
{related_documents}
***** Answer from document ******
{answer_from_document}
***** Graph Query *****
{graph_query}
***** Graph Answer *****
{graph_answer}
```

As shown in Table 8, the illustrative output generation prompt is configured using few-shot learning. The illustrative graph query generation prompt contains an instruction to cause a large language model to function as an output generator 426 and to use evidence-based reasoning to find related documents. The illustrated prompt also includes a number of examples and other instructions, such as the instruction to use evidence-based reasoning, that are designed to constrain the large language model's processing of the input based on a template and to avoid AI hallucination.

The described approach to implementing online real-time generative graph-enhanced retrieval has been shown to scale well even with a large number of data points. Additionally, the described design accommodates parallel computation effectively. The system's scalability and potential for parallelism are significant advantages over conventional approaches, especially when dealing with extensive datasets. Experimental testing of embodiments of the described system has supported its efficiency. The described approaches have shown the ability to complete a search in less than 0.5 seconds among a dataset of, e.g., 20,000 or more documents, which translates to approximately 100,000 nodes (considering each document has a corresponding intra-document graph that contains at least 5 nodes), and thus demonstrates remarkable performance. This rapid processing time is critical for real-time applications and ensures that the system remains responsive even as the size of the dataset (e.g., number of documents, size of document files, etc.) increases. Similarly, the space complexity is well-managed due to its linear relationship with the number of documents in the dataset.

The examples shown in FIG. 4 and the accompanying description, above are provided for illustration purposes. This disclosure is not limited to the described examples. Additional or alternative details and implementations are described herein.

Figure 5:
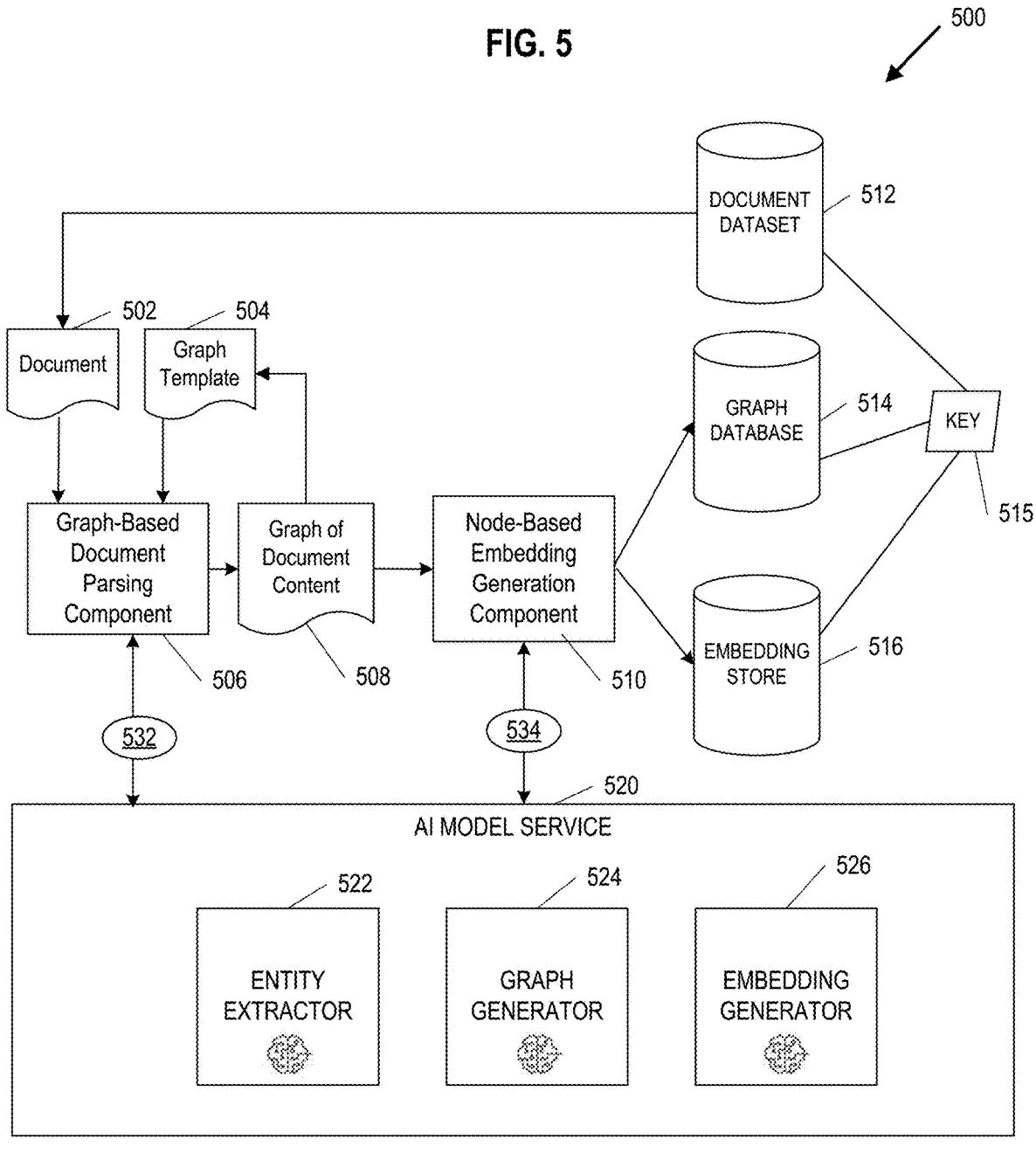
FIG. 5 is a flow diagram of an example method for graph generation using components of a generative graph-enhanced information retrieval system in accordance with some embodiments of the present disclosure.

FIG. 5 is a flow diagram of an example method for graph generation using components of a generative graph-enhanced information retrieval system in accordance with some embodiments of the present disclosure.

In FIG. 5, a graph construction pipeline 500 is initiated by a trigger, such as a command that identifies a document set or an update to a document set. The graph construction pipeline 500 includes a graph-based document parsing component 506, a node-based embedding generation component 510, a document dataset 512, a graph database 514, a key 515, an embedding store 516, and an AI model service 520.

Responsive to a trigger such as a new or updated document 502, each or any of the components 506, 510 communicates bidirectionally via communications 532, 534 (e.g., API calls, etc.) with one or more components of the AI model service 520. The AI model service 520 includes an entity extractor 522, a graph generator 524, and an embedding generator 526. The AI model service 520 includes and enables access to one or more artificial intelligence or machine learning models, which may be configured to function as or in communication with entity extractor 522, graph generator 524, and/or embedding generator 526. For example, one or more of entity extractor 522, graph generator 524, and/or embedding generator 526 can include or reference the same AI model or different models. For instance, entity extractor 522 and graph generator 524 can interact with the same AI model but in different ways, as described below.

The one or more models provided as a service by AI model service 520 can be used to generate information that is stored in graph database 428, embedding database 430, and/or document dataset 432. The AI model service 416 can be implemented as a single service or platform, or as multiple services. For example, different types or versions of artificial intelligence models may be made available by different AI model services.

In some implementations, the graph construction pipeline 500 operates in an offline mode to process all documents in a given document dataset 512, creating respective intra-documents graphs and node-level embeddings for each document 502, creating inter-document links among the intra-document graphs, storing the graphs and links (collectively referred to as "the graph" or the "overall graph of the document dataset") in the graph database 514, storing the node-level embeddings in the embedding store 516, and connecting node-level embeddings with corresponding graph nodes and corresponding document content via keys 515. In other embodiments, an online version of the graph construction pipeline 500 operates to process documents as the documents are added to the document dataset 512 (e.g., as documents are uploaded to a network or created in, e.g., an issue tracking system).

In operation, Graph-based document parsing component 506 communicates with entity extractor 522 and graph generator 524 to create a graph 508 of the content of the document 502 in accordance with a graph template 504, and stores the graph 508 in graph database 514. The node-based embedding generation component 510 generates an embedding of the document content associated with each node of the graph 508 and stores the embeddings along with associated keys 515 in embedding store 516.

In some embodiments, a regular expression (regex)-based graph construction method is used. The regex-based graph construction method is suitable for documents that adhere to a specific document structure. By leveraging the known document structure, regular expressions can be defined and used to extract pertinent information from raw documents. For instance, searching a keyword such as "expected result" in a document using a regular expression such as "/Expected Result(.*?)(?=\n)" can help retrieve the content that includes the expected result.

In other embodiments, a large language model (LLM)-based graph construction method is used. The LLM-based graph construction method processes raw documents to derive the document structure from the document or from a set of documents. An example of a prompt that can be used for LLM-based graph construction is shown in Table 9.

TABLE 9

Example prompt for graph construction.

```
DOCUMENT_PARSING_PROMPT: str = \
""""<|im_start|>
Act like a markdown parsing tool. Be precise and complete. Return a dictionary.
<|im_end|>
<|im_start|>parse the following document markdown strictly based on the template. Return a
dictionary.
*****Template****
{template}
****Markdown*****
{markdown}
****Parse the markdown strictly based on the template. Return a dictionary.****
"""
```

An example of a graph template that can be used for LLM-based graph construction (e.g., referenced by the graph construction prompt of Table 9) is shown in Table 10.

TABLE 10

Example graph template.

```
Key: ""
Summary: ""
Details:
Issue Type: ""
Labels: [ ]
Product Category: ""
Product(s) Impacted: ""
Root Cause: ""
Root Cause Category: ""
Issue description: ""
Steps to Reproduce: ""
Expected Result: ""
Actual Result: ""
Comments: [ ]
Issue Links:
Inward Cloned From: [ ]
Outward Cloned From: [ ]
Inward Action Item: [ ]
Outward Action Item: [ ]
```

The example of Table 10 relates to the issue tracking system use case in which the documents for which graphs are generated include issue tickets. Dependency relationships among different node types are indicated by the indentations. The specifics of the graph template will be different for different use cases and document types.

In some embodiments, the graph topology structure for the graph 508 contains both the nodes and relationships (i.e., edges between nodes), where each node is uniquely identified by a (key, node_type) tuple. For instance (D1, issue_description) represents the issue_description section of the document D1. Each non-root node within the graph also contains the corresponding portion of document content in the field "value." For instance, the node "issue_description" (which is a non-root node) has a value field that contains the issue description for that particular document D1. The embedding information typically is not stored in the graph database, but rather is stored in the embedding store 516 for embedding-based retrieval purposes.

The embedding store 516 stores the embedding vector for each node of the graph 508 of each document 502. The embedding generator 526 generates each embedding as, for example, an n-dimensional floating point vector generated using a BERT model, where n is, e.g., greater than 500, or greater than 700, or in the range of about 760 or higher. To map the node-level embedding vectors back to the graph structure, each embedding record in the embedding store 516 also includes the key 515 (e.g., the node identifier tuple. In some embodiments, to help narrow-down the searching space at embedding-based retrieval (EBR) time, each document has an associated set of predefined filters (e.g., product category). These filters are effective in reducing the embedding-based retrieval searching time cost significantly especially when the searching space is large. To illustrate, a document dataset may contain tens of thousands of documents equating to hundreds of thousands of nodes. Without filtering, all of these hundreds of thousands of nodes would need to be processed using EBR. However, with filtering, the workload reduces to approximately one-sixth of the total number of nodes, thereby potentially accelerating the EBR search process by a factor of six.

FIG. 6 is a block diagram of a computing system that includes a generative graph-enhanced information retrieval system in accordance with some embodiments of the present disclosure.

In the embodiment of FIG. 6, a computing system 600 includes one or more user systems 610, a network 620, an application system 630, a generative graph-enhanced retrieval system 680, a data storage system 660, an event logging service 670, and an AI model service 690 period. Embodiments of generative graph-enhanced retrieval system 680 include components shown in and described herein, for example components of one or more of FIG. 1A, FIG. 4, or FIG. 5.

All or at least some components of generative graph-enhanced retrieval system 680 are implemented at the user system 610, in some implementations. For example, portions of generative graph-enhanced retrieval system 680 are implemented directly upon a single client device such that communications involving applications running on user system 610 and generative graph-enhanced retrieval system 680 occur on-device without the need to communicate with, e.g., one or more servers, over the Internet. Dashed lines are used in FIG. 6 to indicate that all or portions of generative graph-enhanced retrieval system 680 can be implemented directly on the user system 610, e.g., the user's client device. In other words, both user system 610 and generative graph-enhanced retrieval system 680 can be implemented on the same computing device, in some implementations. In other implementations, all or portions of generative graph-enhanced retrieval system 680 are implemented on one or more servers and in communication with user systems 610 via network 620. Components of the computing system 600 including the generative graph-enhanced retrieval system 680 are described in more detail herein.

A user system 610 includes at least one computing device, such as a personal computing device, a server, a mobile computing device, a wearable electronic device, or a smart appliance, and at least one software application that the at least one computing device is capable of executing, such as an operating system or a front end of an online system. Many different user systems 610 can be connected to network 620 at the same time or at different times. Different user systems 610 can contain similar components as described in connection with the illustrated user system 610. For example, many different end users of computing system 600 can be interacting with many different instances of application system 630 through their respective user systems 610, at the same time or at different times.

User system 610 includes a user interface 612. User interface 612 is installed on user system 610 or accessible to user system 610 via network 620. Embodiments of user interface 612 include a front end portion of generative graph-enhanced retrieval system 680.

User interface 612 includes, for example, a graphical display screen that includes graphical user interface elements such as at least one input box or other input mechanism and at least one slot. A slot as used herein refers to a space on a graphical display such as a web page or mobile device screen, into which digital content such as documents, search results, feed items, chat boxes, or threads, can be loaded for display to the user. For example, user interface 612 may be configured with a scrollable arrangement of variable-length slots that simulates an online chat or instant messaging session and/or a scrollable arrangement of slots that contain search results. The locations and dimensions of a particular graphical user interface element on a screen are specified using, for example, a markup language such as HTML (Hypertext Markup Language). On a typical display screen, a graphical user interface element is defined by two-dimensional coordinates. In other implementations such as virtual reality or augmented reality implementations, a slot may be defined using a three-dimensional coordinate system.

User interface 612 can be used to interact with one or more application systems 630. For example, user interface 612 enables the user of a user system 610 to create, edit, send, view, receive, process, and organize search queries, search results, content items, news feeds, and/or portions of online dialogs. In some implementations, user interface 612 enables the user to input requests (e.g., queries) for various different types of information, to initiate user interface events, and to view or otherwise perceive output such as data and/or digital content produced by, e.g., an application system 630 or generative graph-enhanced retrieval system 680. For example, user interface 612 can include a graphical user interface (GUI), a conversational voice/speech interface, a virtual reality, augmented reality, or mixed reality interface, and/or a haptic interface. User interface 612 includes a mechanism for entering search queries and/or selecting search criteria (e.g., facets, filters, etc.), selecting GUI user input control elements, and interacting with digital content such as search results, entity profiles, posts, articles, feeds, and online dialogs. Examples of user interface 612 include web browsers, command line interfaces, and mobile app front ends. User interface 612 as used herein can include application programming interfaces (APIs).

Network 620 includes an electronic communications network. Network 620 can be implemented on any medium or mechanism that provides for the exchange of digital data, signals, and/or instructions between the various components of computing system 600. Examples of network 620 include, without limitation, a Local Area Network (LAN), a Wide Area Network (WAN), an Ethernet network or the Internet, or at least one terrestrial, satellite or wireless link, or a combination of any number of different networks and/or communication links.

Application system 630 can include, for example, one or more online systems that provide social network services, general-purpose search engines, specific-purpose search engines, messaging systems, content distribution platforms, e-commerce software, enterprise software, or any combination of any of the foregoing or other types of software. Application system 630 includes any type of application system that provides or enables the retrieval of and interactions with at least one form of digital content, including machine-generated content, via user interface 612. In some implementations, portions of generative graph-enhanced retrieval system 680 are components of application system 630.

In some implementations, a front end portion of application system 630 can operate in user system 610, for example as a plugin or widget in a graphical user interface of a web application, mobile software application, or as a web browser executing user interface 612. In an embodiment, a mobile app or a web browser of a user system 610 can transmit a network communication such as an HTTP request over network 620 in response to user input that is received through a user interface provided by the web application, mobile app, or web browser, such as user interface 612. A server running application system 630 can receive the input from the web application, mobile app, or browser executing user interface 612, perform at least one operation using the input, and return output to the user interface 612 using a network communication such as an HTTP response, which the web application, mobile app, or browser receives and processes at the user system 610.

A request includes, for example, a network message such as an HTTP (HyperText Transfer Protocol) request for a transfer of data from an application front end to the application's back end, or from the application's back end to the front end, or, more generally, a request for a transfer of data between two different devices or systems, such as data transfers between servers and user systems. A request is formulated, e.g., by a browser or mobile app at a user device, in connection with a user interface event such as a login, click on a graphical user interface element, an input of a search query, or a page load. In some implementations, content distribution service 638 is part of application system 630. In other implementations, content distribution service 638 interfaces with application system 630 and/or generative graph-enhanced retrieval system 680, for example, via one or more application programming interfaces (APIs).

AI model service 690 includes one or more artificial intelligence-based models, such as discriminative and/or generative models, neural networks and/or other types of machine learning-based models, probabilistic models, statistical models, transformer-based models, and/or any combination of any of the foregoing. AI model service 690 enables the generative graph-enhanced retrieval system to access to these models, for example by providing an application programming interface (API). AI model service 690 can include a monitoring service that periodically generates, publishes, or broadcasts latency and/or other performance metrics associated with the models. For example, AI model service 690 can provide a set of APIs that can be used by generative graph-enhanced retrieval system 680 to obtain performance metrics for the model(s) used by the generative graph-enhanced retrieval system 680.

Event logging service 670 captures and records network activity data generated during operation of application system 630 and/or generative graph-enhanced retrieval system 680, including user interface events generated at user systems 610 via user interface 612, in real time, and formulates the user interface events and/or other network activity data into a data stream that can be consumed by, for example, a stream processing system. Examples of network activity data include logins, page loads, input of search queries or query terms, selections of facets or filters, clicks on search results or graphical user interface control elements, scrolling lists of search results, and social action data such as likes, shares, comments, and social reactions (e.g., "insightful," "curious," etc.). For instance, when a user of application system 630 via a user system 610 enters input or clicks on a user interface element, such as a search result, or a user interface control element such as a view, comment, share, or reaction button, or uploads a file, or inputs a query, or scrolls through a feed, etc., event logging service 670 fires an event to capture and store log data including an identifier, such as a session identifier, an event type, a date/timestamp at which the user interface event occurred, and possibly other information about the user interface event, such as the impression portal and/or the impression channel involved in the user interface event. Examples of impression portals and channels include, for example, device types, operating systems, and software platforms, e.g., web applications and mobile applications.

For instance, when a user enters input or reacts to system-generated output, such as a list of search results, event logging service 670 stores the corresponding event data in a log. Event logging service 670 generates a data stream that includes a record of real-time event data for each user interface event that has occurred. Event data logged by event logging service 670 can be pre-processed and anonymized as needed so that it can be used as context data to, for example, configure one or more instructions for one or more artificial intelligence models (e.g., large language models), or to modify weights, affinity scores, or similarity measurements that are assigned by the generative graph-enhanced retrieval system to search results or data resources.

Data storage system 660 includes data stores and/or data services that store digital data received, used, manipulated, and produced by application system 630 and/or generative graph-enhanced retrieval system 680, including contextual data, state data, prompts and/or prompt templates for generative artificial intelligence models or large language models, user inputs, system-generated outputs, documents, graphs, graph templates, and embeddings.

In the example of FIG. 6, data storage system 660 includes a template data store 662, a prompt data store 664, a content data store 665, a graph data store 667, and an embedding data store 669. Template data store 662 stores templates, including graph templates. Prompt data store 664 stores prompt templates and/or prompts which include one or more instructions that can be input to one or more artificial intelligence models (e.g., generative models, large language models). Content data store 665 stores documents and/or portions of documents. Graph data store 667 stores graphs of documents, including inter-document graphs and intra-document graphs, using, e.g., a graph database management system. Embedding data store 669 stores embeddings that correspond to documents and/or portions of documents that correspond to nodes of graphs. While shown in FIG. 6 as components of a data storage system 660, all or portions of each or any of template data store 662, prompt data store 664, content data store 665, graph data store 667, and/or embedding data store 669 are implemented on the user system 610 in some embodiments. For example, a data store can include a volatile memory such as a form of random access memory (RAM) available on user system 610 for storing state data generated at the user system 610 or an application system 630. As another example, in some implementations, a separate, personalized version of each or any of the template data store 662, prompt data store 664, content data store 665, graph data store 667, and/or embedding data store 669 is created for each user such that data is not shared between or among the separate, personalized versions of the data stores.

In some embodiments, data storage system 660 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine. Data stores of data storage system 660 can be configured to store data produced by real-time and/or offline (e.g., batch) data processing. A data store configured for real-time data processing can be referred to as a real-time data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 660 resides on at least one persistent and/or volatile storage device that can reside within the same local network as at least one other device of computing system 600 and/or in a network that is remote relative to at least one other device of computing system 600. Thus, although depicted as being included in computing system 600, portions of data storage system 660 can be part of computing system 600 or accessed by computing system 600 over a network, such as network 620.

While not specifically shown, it should be understood that any of user system 610, application system 630, generative graph-enhanced retrieval system 680, data storage system 660, event logging service 670, and AI model service 690 includes an interface embodied as computer programming code stored in computer memory that when executed causes a computing device to enable bidirectional communication with any other of user system 610, application system 630, generative graph-enhanced retrieval system 680, data storage system 660, event logging service 670, and AI model service 690 using a communicative coupling mechanism. Examples of communicative coupling mechanisms include network interfaces, inter-process communication (IPC) interfaces and application program interfaces (APIs).

Each of user system 610, application system 630, generative graph-enhanced retrieval system 680, data storage system 660, event logging service 670, and AI model service 690 is implemented using at least one computing device that is communicatively coupled to electronic communications network 620. Any of user system 610, application system 630, generative graph-enhanced retrieval system 680, data storage system 660, event logging service 670, and AI model service 690 can be bidirectionally communicatively coupled by network 620. User system 610 as well as other different user systems (not shown) can be bidirectionally communicatively coupled to application system 630 and/or generative graph-enhanced retrieval system 680.

A typical user of user system 610 can be an administrator or end user of application system 630 or generative graph-enhanced retrieval system 680. User system 610 is configured to communicate bidirectionally with any of application system 630, generative graph-enhanced retrieval system 680, data storage system 660, event logging service 670, and/or AI model service 690 over network 620.

Terms such as component, system, and model as used herein refer to computer implemented structures, e.g., combinations of software and hardware such as computer programming logic, data, and/or data structures implemented in electrical circuitry, stored in memory, and/or executed by one or more hardware processors.

The features and functionality of user system 610, application system 630, generative graph-enhanced retrieval system 680, data storage system 660, event logging service 670, and AI model service 690 are implemented using computer software, hardware, or software and hardware, and can include combinations of automated functionality, data structures, and digital data, which are represented schematically in the figures. User system 610, application system 630, generative graph-enhanced retrieval system 680, data storage system 660, event logging service 670, and AI model service 690 are shown as separate elements in FIG. 6 for case of discussion but, except as otherwise described, the illustration is not meant to imply that separation of these elements is required. The illustrated systems, services, and data stores (or their functionality) of each of user system 610, application system 630, generative graph-enhanced retrieval system 680, data storage system 660, event logging service 670, and AI model service 690 can be divided over any number of physical systems, including a single physical computer system, and can communicate with each other in any appropriate manner.

Figure 8:
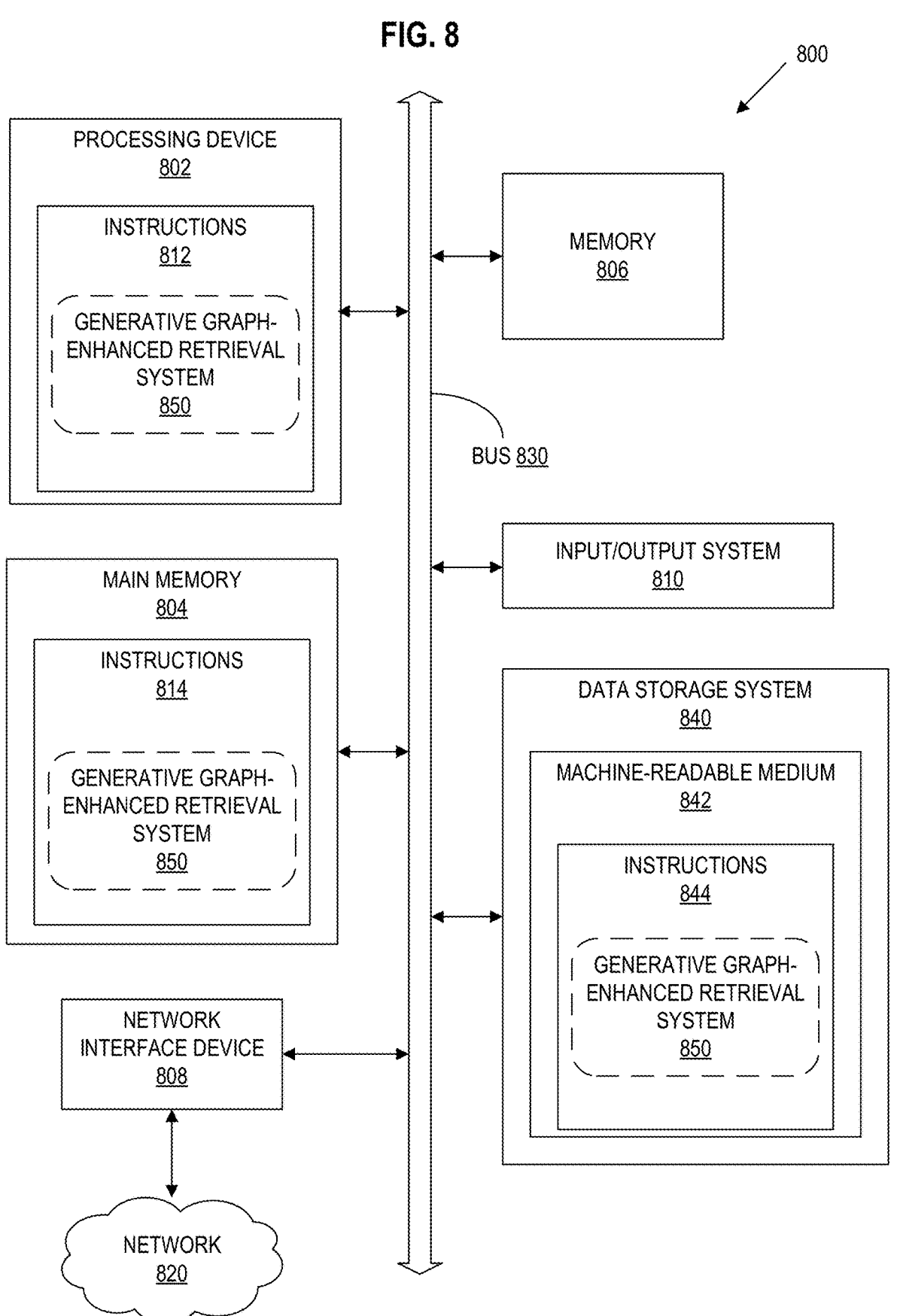
FIG. 8 is a block diagram of an example computer system including components of a generative graph-enhanced information retrieval system in accordance with some embodiments of the present disclosure.

In the embodiment of FIG. 8, portions of generative graph-enhanced retrieval system 680 that may be implemented on a front end system, such as one or more user systems, and portions of generative graph-enhanced retrieval system 680 that may be implemented on a back end system such as one or more servers, are collectively represented as generative graph-enhanced retrieval system 850 for ease of discussion only. For example, portions of generative graph-enhanced retrieval system 680 are not required to be implemented all on the same computing device, in the same memory, or loaded into the same memory at the same time. For instance, access to portions of generative graph-enhanced retrieval system 680 can be limited to different, mutually exclusive sets of user systems and/or servers. For instance, in some implementations, a separate, personalized version of generative graph-enhanced retrieval system 680 is created for each user of the generative graph-enhanced retrieval system 680 such that data is not shared between or among the separate, personalized versions of the generative graph-enhanced retrieval system 680. Additionally, certain portions of generative graph-enhanced retrieval system 680 typically may be implemented on user systems while other portions of generative graph-enhanced retrieval system 680 typically may be implemented on a server computer or group of servers. In some embodiments, however, one or more portions of generative graph-enhanced retrieval system 680 are implemented on user systems. For example, generative graph-enhanced retrieval system 680 is entirely implemented on user systems, e.g., client devices, in some implementations. For instance, a version of generative graph-enhanced retrieval system 680 can be embedded in a client device's operating system or stored at the client device and loaded into memory at execution time. Further details with regard to the operations of generative graph-enhanced retrieval system 850 are described herein.

FIG. 7 is a flow diagram of an example method for generative graph-enhanced information retrieval using components of a generative graph-enhanced information retrieval system in accordance with some embodiments of the present disclosure.

The method 700 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by one or more components of a generative graph-enhanced retrieval system such as the generative graph-enhanced retrieval system 680 of FIG. 6. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

At operation 702, the processing device parses a query into a first query portion and at least one second query portion. In some implementations, parsing the query includes passing the query to the generative artificial intelligence model with an instruction to cause the generative artificial intelligence model to parse the query based on a graph template, and receiving the first query portion and the at least one second query portion from the generative artificial intelligence model in response to the query and the instruction.

At operation 704, the processing device matches an embedding of the at least one second query portion with an embedding that corresponds to a portion of a document of a document set. In some implementations, an embedding-based retrieval approach is used to perform the matching.

At operation 706, the processing device maps the portion of the document (whose embedding matches the embedding of the at least one second query portion) to a first node of a graph. In some implementations, mapping the portion of the document to the first node of the graph includes matching the embedding of the portion of the document with the first node via a key including an identifier and an entity type.

At operation 708, the processing device uses a generative artificial intelligence model to construct a graph query based on at least the first node (the node associated with the embedding that matches the embedding of the at least one second query portion). In some implementations, constructing the graph query includes passing at least the first node of the graph to the generative artificial intelligence model with an instruction to cause the generative artificial intelligence model to generate and output the graph query based on at least the first node, receiving the graph query from the generative artificial intelligence model in response to at least the first node and the instruction, configuring the graph query for output at a device; and creating an updated version of the graph query based on the at least one signal received via the device.

At operation 710, the processing device executes the graph query on the graph to identify a second node of the graph, where the second node corresponds to the first query portion. In some implementations, executing the graph query on the graph to identify the second node of the graph includes creating a text representation of the graph, passing the text representation of the graph to the generative artificial intelligence model with an instruction to cause the generative artificial intelligence model to execute the graph query using the text representation of the graph, and receiving the second node from the generative artificial intelligence model in response to the instruction and the text representation of the graph.

At operation 712, the processing device extracts a path from the graph, where the path includes the first node, the second node, and at least one edge connecting the first node with the second node. In some implementations, extracting the path from the graph includes passing the first node and the second node to the generative artificial intelligence model with an instruction to cause the generative artificial intelligence model to determine the path based on the first node and the second node, and receiving the path from the generative artificial intelligence model in response to the instruction, the first node, and the second node.

At operation 714, the processing device configures the path for output at a device. In some implementations, configuring the path for output at a device includes passing the path to the generative artificial intelligence model with an instruction to cause the generative artificial intelligence model to generate the output based on the path, and receiving the output from the generative artificial intelligence model in response to the instruction and the path.

At operation 716, the processing device creates an updated version of the path based on at least one signal received via the device. In some implementations, creating the updated version of the path includes at least one of: adding at least one node to the path based on the at least one signal, removing at least one node from the path based on the at least one signal, adding at least one edge to the path based on the at least one signal, or removing at least one edge from the path based on the at least one signal.

At operation 718, the processing device uses the generative artificial intelligence model to, based on the updated version of the path, formulate a response to the query for output at the device. In some implementations, formulating the response to the query for output at the device includes passing the query, the path, and the at least one signal to the generative intelligence model with an instruction to cause the generative artificial intelligence model to generate the response based on the query, the path, and the at least one signal, and receiving the response from the generative artificial intelligence model in response to the instruction, the query, the path, and the at least one signal.

In some implementations, the method 700 includes, using the generative artificial intelligence model, constructing the graph to include an inter-document graph of the document set and an intra-document graph of each document in the document set, where the intra-document graph includes a root node corresponding to an identifier of the document and at least one entity node connected to the root node via at least one edge; and using the identifier to link the at least one entity node to a corresponding embedding stored in an embedding store.

In some implementations, constructing the graph includes passing the document set to the generative artificial intelligence model with an instruction to cause the generative artificial intelligence model to convert the document set into the graph in accordance with a graph template; and receiving the graph from the generative artificial intelligence model in response to the instruction, the document set, and the graph template.

The examples shown in FIG. 7 and the accompanying description, above are provided for illustration purposes. This disclosure is not limited to the described examples.

FIG. 8 is a block diagram of an example computer system including components of a generative graph-enhanced information retrieval system in accordance with some embodiments of the present disclosure.

In FIG. 8, an example machine of a computer system 800 is shown, within which a set of instructions for causing the machine to perform any of the methodologies discussed herein can be executed. In some embodiments, the computer system 800 can correspond to a component of a networked computer system (e.g., as a component of the computing system 100 of FIG. 1A or the computer system 600 of FIG. 6) that includes, is coupled to, or utilizes a machine to execute an operating system to perform operations corresponding to one or more components of the generative graph-enhanced retrieval system of FIG. 1A or the generative graph-enhanced retrieval system 680 of FIG. 6. For example, computer system 800 corresponds to a portion of computing system 600 when the computing system is executing a portion of generative graph-enhanced retrieval system or generative graph-enhanced retrieval system 680.

The machine is connected (e.g., networked) to other machines in a network, such as a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a wearable device, a server, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a memory 803 (e.g., flash memory, static random access memory (SRAM), etc.), an input/output system 810, and a data storage system 840, which communicate with each other via a bus 830.

Processing device 802 represents at least one general-purpose processing device such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be at least one special-purpose processing device such as an application specific integrated circuit (ASIC), a field programmable gate array (FPGA), a digital signal processor (DSP), network processor, or the like. The processing device 802 is configured to execute instructions 812 for performing the operations and steps discussed herein.

In some embodiments of FIG. 8, generative graph-enhanced retrieval system 850 represents portions of generative graph-enhanced retrieval system 680 while the computer system 800 is executing those portions of generative graph-enhanced retrieval system 680. Instructions 812 include portions of generative graph-enhanced retrieval system 850 when those portions of the generative graph-enhanced retrieval system 850 are being executed by processing device 802. Thus, the generative graph-enhanced retrieval system 850 is shown in dashed lines as part of instructions 812 to illustrate that, at times, portions of the generative graph-enhanced retrieval system 850 are executed by processing device 802. For example, when at least some portion of the generative graph-enhanced retrieval system 850 is embodied in instructions to cause processing device 802 to perform the method(s) described herein, some of those instructions can be read into processing device 802 (e.g., into an internal cache or other memory) from main memory 804 and/or data storage system 840. However, it is not required that all of the generative graph-enhanced retrieval system 850 be included in instructions 812 at the same time and portions of the generative graph-enhanced retrieval system 850 are stored in at least one other component of computer system 800 at other times, e.g., when at least one portion of the generative graph-enhanced retrieval system 850 are not being executed by processing device 802.

The computer system 800 further includes a network interface device 808 to communicate over the network 820. Network interface device 808 provides a two-way data communication coupling to a network. For example, network interface device 808 can be an integrated-services digital network (ISDN) card, cable modem, satellite modem, or a modem to provide a data communication connection to a corresponding type of telephone line. As another example, network interface device 808 can be a local area network (LAN) card to provide a data communication connection to a compatible LAN. Wireless links can also be implemented. In any such implementation network interface device 808 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 800.

Computer system 800 can send messages and receive data, including program code, through the network(s) and network interface device 808. In the Internet example, a server can transmit a requested code for an application program through the Internet and network interface device 808. The received code can be executed by processing device 802 as it is received, and/or stored in data storage system 840, or other non-volatile storage for later execution.

The input/output system 810 includes an output device, such as a display, for example a liquid crystal display (LCD) or a touchscreen display, for displaying information to a computer user, or a speaker, a haptic device, or another form of output device. The input/output system 810 can include an input device, for example, alphanumeric keys and other keys configured for communicating information and command selections to processing device 802. An input device can, alternatively or in addition, include a cursor control, such as a mouse, a trackball, or cursor direction keys for communicating direction information and command selections to processing device 802 and for controlling cursor movement on a display. An input device can, alternatively or in addition, include a microphone, a sensor, or an array of sensors, for communicating sensed information to processing device 802. Sensed information can include voice commands, audio signals, geographic location information, haptic information, and/or digital imagery, for example.

The data storage system 840 includes a machine-readable storage medium 842 (also known as a computer-readable medium) on which is stored at least one set of instructions 844 or software embodying any of the methodologies or functions described herein. The instructions 844 can also reside, completely or at least partially, within the main memory 804 and/or within the processing device 802 during execution thereof by the computer system 800, the main memory 804 and the processing device 802 also constituting machine-readable storage media. In one embodiment, the instructions 844 include instructions to implement functionality corresponding to a generative graph-enhanced retrieval system 850 (e.g., the generative graph-enhanced retrieval system 100 of FIG. 1A or generative graph-enhanced retrieval system 680 of FIG. 6).

Dashed lines are used in FIG. 8 to indicate that it is not required that the generative graph-enhanced retrieval system be embodied entirely in instructions 812, 814, and 844 at the same time. In one example, portions of the generative graph-enhanced retrieval system are embodied in instructions 814, which are read into main memory 804 as instructions 814, and portions of instructions 812 are read into processing device 802 as instructions 812 for execution. In another example, some portions of the generative graph-enhanced retrieval system are embodied in instructions 844 while other portions are embodied in instructions 814 and still other portions are embodied in instructions 812.

While the machine-readable storage medium 842 is shown in an example embodiment to be a single medium, the term "machine-readable storage medium" should be taken to include a single medium or multiple media that store the instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media. The examples shown in FIG. 8 and the accompanying description, above are provided for illustration purposes. This disclosure is not limited to the described examples.

Some portions of the preceding detailed description have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100 or the computing system 600, can carry out the above-described computer-implemented methods in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The techniques described herein may be implemented with privacy safeguards to protect user privacy. Furthermore, the techniques described herein may be implemented with user privacy safeguards to prevent unauthorized access to personal data and confidential data. The training of the AI models described herein is executed to benefit all users fairly, without causing or amplifying unfair bias.

According to some embodiments, the techniques for the models described herein do not make inferences or predictions about individuals unless requested to do so through an input. According to some embodiments, the models described herein do not learn from and are not trained on user data without user authorization. In instances where user data is permitted and authorized for use in AI features and tools, it is done in compliance with a user's visibility settings, privacy choices, user agreement and descriptions, and the applicable law. According to the techniques described herein, users may have full control over the visibility of their content and who sees their content, as is controlled via the visibility settings. According to the techniques described herein, users may have full control over the level of their personal data that is shared and distributed between different AI platforms that provide different functionalities.

According to the techniques described herein, users may have full control over the level of access to their personal data that is shared with other parties. According to the techniques described herein, personal data provided by users may be processed to determine prompts when using a generative AI feature at the request of the user, but not to train generative AI models. In some embodiments, users may provide feedback while using the techniques described herein, which may be used to improve or modify the platform and products. In some embodiments, any personal data associated with a user, such as personal information provided by the user to the platform, may be deleted from storage upon user request. In some embodiments, personal information associated with a user may be permanently deleted from storage when a user deletes their account from the platform.

According to the techniques described herein, personal data may be removed from any training dataset that is used to train AI models. The techniques described herein may utilize tools for anonymizing member and customer data. For example, user's personal data may be redacted and minimized in training datasets for training AI models through delexicalization tools and other privacy enhancing tools for safeguarding user data. The techniques described herein may minimize use of any personal data in training AI models, including removing and replacing personal data. According to the techniques described herein, notices may be communicated to users to inform how their data is being used and users are provided controls to opt-out from their data being used for training AI models.

According to some embodiments, tools are used with the techniques described herein to identify and mitigate risks associated with AI in all products and AI systems. In some embodiments, notices may be provided to users when AI tools are being used to provide features.

Illustrative examples of the technologies disclosed herein are provided below. An embodiment of the technologies may include any of the examples described herein, or any combination of any of the examples described herein, or any combination of any portions of the examples described herein.

In some aspects, the techniques described herein relate to a method including: parsing a query into a first query portion and at least one second query portion; matching an embedding of the at least one second query portion with an embedding that corresponds to a portion of a document of a document set; mapping the portion of the document to a first node of a graph; by a generative artificial intelligence model, constructing a graph query based on at least the first node; executing the graph query on the graph to identify a second node of the graph, wherein the second node corresponds to the first query portion; extracting a path from the graph, wherein the path includes the first node, the second node, and at least one edge connecting the first node with the second node; configuring the path for output at a device; creating an updated version of the path based on at least one signal received via the device; and by the generative artificial intelligence model, based on the updated version of the path, formulating a response to the query for output at the device.

In some aspects, the techniques described herein relate to a method, wherein parsing the query includes: passing the query to the generative artificial intelligence model with an instruction to cause the generative artificial intelligence model to parse the query based on a graph template; and receiving the first query portion and the at least one second query portion from the generative artificial intelligence model in response to the query and the instruction.

In some aspects, the techniques described herein relate to a method, wherein mapping the portion of the document to the first node of the graph includes matching the embedding of the portion of the document with the first node via a key including an identifier and an entity type.

In some aspects, the techniques described herein relate to a method, wherein constructing the graph query includes: passing at least the first node of the graph to the generative artificial intelligence model with an instruction to cause the generative artificial intelligence model to generate and output the graph query based on at least the first node; receiving the graph query from the generative artificial intelligence model in response to at least the first node and the instruction; configuring the graph query for output at a device; and creating an updated version of the graph query based on the at least one signal received via the device.

In some aspects, the techniques described herein relate to a method, wherein executing the graph query on the graph to identify the second node of the graph includes: creating a text representation of the graph; passing the text representation of the graph to the generative artificial intelligence model with an instruction to cause the generative artificial intelligence model to execute the graph query using the text representation of the graph; and receiving the second node from the generative artificial intelligence model in response to the instruction and the text representation of the graph.

In some aspects, the techniques described herein relate to a method, wherein extracting the path from the graph includes: passing the first node and the second node to the generative artificial intelligence model with an instruction to cause the generative artificial intelligence model to determine the path based on the first node and the second node; and receiving the path from the generative artificial intelligence model in response to the instruction, the first node, and the second node.

In some aspects, the techniques described herein relate to a method, wherein configuring the path for output at a device includes: passing the path to the generative artificial intelligence model with an instruction to cause the generative artificial intelligence model to generate the output based on the path; and receiving the output from the generative artificial intelligence model in response to the instruction and the path.

In some aspects, the techniques described herein relate to a method, wherein creating the updated version of the path includes at least one of: adding at least one node to the path based on the at least one signal; removing at least one node from the path based on the at least one signal; adding at least one edge to the path based on the at least one signal; or removing at least one edge from the path based on the at least one signal.

In some aspects, the techniques described herein relate to a method, wherein formulating the response to the query for output at the device includes: passing the query, the path, and the at least one signal to the generative artificial intelligence model with an instruction to cause the generative artificial intelligence model to generate the response based on the query, the path, and the at least one signal; and receiving the response from the generative artificial intelligence model in response to the instruction, the query, the path, and the at least one signal.

In some aspects, the techniques described herein relate to a method, further including: using the generative artificial intelligence model, constructing the graph to include an inter-document graph of the document set and an intra-document graph of each document in the document set, wherein the intra-document graph includes a root node corresponding to an identifier of the document and at least one non-root node connected to the root node via at least one edge; and using the identifier to link the at least one non-root node to a corresponding embedding stored in an embedding store.

In some aspects, the techniques described herein relate to a method, wherein constructing the graph includes: passing the document set to the generative artificial intelligence model with an instruction to cause the generative artificial intelligence model to convert the document set into the graph in accordance with a graph template; and receiving the graph from the generative artificial intelligence model in response to the instruction, the document set, and the graph template.

In some aspects, the techniques described herein relate to a system including: at least one processor; and at least one memory coupled to the at least one processor, wherein the at least one memory includes at least one instruction that, when executed by the at least one processor, cause the at least one processor to perform at least one operation including: parsing a query into a first query portion and at least one second query portion; matching an embedding of the at least one second query portion with an embedding that corresponds to a portion of a document of a document set; mapping the portion of the document to a first node of a graph; by a generative artificial intelligence model, constructing a graph query based on at least the first node; executing the graph query on the graph to identify a second node of the graph, wherein the second node corresponds to the first query portion; extracting a path from the graph, wherein the path includes the first node, the second node, and at least one edge connecting the first node with the second node; and configuring the path for output at a device.

In some aspects, the techniques described herein relate to a system, wherein constructing the graph query includes: passing at least the first node of the graph to the generative artificial intelligence model with an instruction to cause the generative artificial intelligence model to generate and output the graph query based on at least the first node; receiving the graph query from the generative artificial intelligence model in response to at least the first node and the instruction; configuring the graph query for output at a device; and creating an updated version of the graph query based on at least one signal received via the device.

In some aspects, the techniques described herein relate to a system, wherein executing the graph query on the graph to identify the second node of the graph includes: creating a text representation of the graph; passing the text representation of the graph to the generative artificial intelligence model with an instruction to cause the generative artificial intelligence model to execute the graph query using the text representation of the graph; and receiving the second node from the generative artificial intelligence model in response to the instruction and the text representation of the graph.

In some aspects, the techniques described herein relate to a system, wherein extracting the path from the graph includes: passing the first node and the second node to the generative artificial intelligence model with an instruction to cause the generative artificial intelligence model to determine the path based on the first node and the second node; and receiving the path from the generative artificial intelligence model in response to the instruction, the first node, and the second node.

In some aspects, the techniques described herein relate to at least one non-transitory machine-readable storage medium including at least one instruction that, when executed by at least one processor, causes the at least one processor to perform at least one operation including: parsing a query into a first query portion and at least one second query portion; matching an embedding of the at least one second query portion with an embedding that corresponds to a portion of a document of a document set; mapping the portion of the document to a first node of a graph; by a generative artificial intelligence model, constructing a graph query based on at least the first node; executing the graph query on the graph; identifying a second node of the graph, wherein the second node corresponds to the first query portion; and configuring a path for output at a device, wherein the path includes the first node, the second node, and at least one edge connecting the first node with the second node in the graph.

In some aspects, the techniques described herein relate to an at least one non-transitory machine-readable storage medium, wherein constructing the graph query includes: passing at least the first node of the graph to the generative artificial intelligence model with an instruction to cause the generative artificial intelligence model to generate and output the graph query based on at least the first node; receiving the graph query from the generative artificial intelligence model in response to at least the first node and the instruction; configuring the graph query for output at a device; and creating an updated version of the graph query based on at least one signal received via the device.

In some aspects, the techniques described herein relate to an at least one non-transitory machine-readable storage medium, wherein identifying the second node of the graph includes: creating a text representation of the graph; passing the text representation of the graph to the generative artificial intelligence model with an instruction to cause the generative artificial intelligence model to execute the graph query using the text representation of the graph; and receiving the second node from the generative artificial intelligence model in response to the instruction and the text representation of the graph.

In some aspects, the techniques described herein relate to an at least one non-transitory machine-readable storage medium, wherein the at least one instruction, when executed by the at least one processor, causes the at least one processor to perform at least one operation including: passing the first node and the second node to the generative artificial intelligence model with an instruction to cause the generative artificial intelligence model to determine the path based on the first node and the second node; and receiving the path from the generative artificial intelligence model in response to the instruction, the first node, and the second node.

In some aspects, the techniques described herein relate to an at least one non-transitory machine-readable storage medium, wherein the at least one instruction, when executed by the at least one processor, causes the at least one processor to perform at least one operation including: using the generative artificial intelligence model, constructing the graph to include an inter-document graph of the document set and an intra-document graph of each document in the document set, wherein the intra-document graph includes a root node corresponding to an identifier of the document and at least one non-root node connected to the root node via at least one edge; and using the identifier to link the at least one non-root node to a corresponding embedding stored in an embedding store.

Clause 1. A method comprising: parsing a query into a first query portion and at least one second query portion; matching an embedding of the at least one second query portion with an embedding that corresponds to a portion of a document of a document set; mapping the portion of the document to a first node of a graph; by a generative artificial intelligence model, constructing a graph query based on at least the first node; executing the graph query on the graph to identify a second node of the graph, wherein the second node corresponds to the first query portion; extracting a path from the graph, wherein the path comprises the first node, the second node, and at least one edge connecting the first node with the second node; configuring the path for output at a device; creating an updated version of the path based on at least one signal received via the device; and by the generative artificial intelligence model, based on the updated version of the path, formulating a response to the query for output at the device.

Clause 2. The method of clause 1, wherein parsing the query comprises: passing the query to the generative artificial intelligence model with an instruction to cause the generative artificial intelligence model to parse the query based on a graph template; and receiving the first query portion and the at least one second query portion from the generative artificial intelligence model in response to the query and the instruction.

Clause 3. The method of clause 1 or clause 2, wherein mapping the portion of the document to the first node of the graph comprises matching the embedding of the portion of the document with the first node via a key comprising an identifier and an entity type.

Clause 4. The method of any of the preceding clauses, wherein constructing the graph query comprises: passing at least the first node of the graph to the generative artificial intelligence model with an instruction to cause the generative artificial intelligence model to generate and output the graph query based on at least the first node; receiving the graph query from the generative artificial intelligence model in response to at least the first node and the instruction; configuring the graph query for output at a device; and creating an updated version of the graph query based on the at least one signal received via the device.

Clause 5. The method of any of the preceding clauses, wherein executing the graph query on the graph to identify the second node of the graph comprises: creating a text representation of the graph; passing the text representation of the graph to the generative artificial intelligence model with an instruction to cause the generative artificial intelligence model to execute the graph query using the text representation of the graph; and receiving the second node from the generative artificial intelligence model in response to the instruction and the text representation of the graph.

Clause 6. The method of any of the preceding clauses, wherein extracting the path from the graph comprises: passing the first node and the second node to the generative artificial intelligence model with an instruction to cause the generative artificial intelligence model to determine the path based on the first node and the second node; and receiving the path from the generative artificial intelligence model in response to the instruction, the first node, and the second node.

Clause 7. The method of any of the preceding clauses, wherein configuring the path for output at a device comprises: passing the path to the generative artificial intelligence model with an instruction to cause the generative artificial intelligence model to generate the output based on the path; and receiving the output from the generative artificial intelligence model in response to the instruction and the path.

Clause 8. The method of any of the preceding clauses, wherein creating the updated version of the path comprises at least one of: adding at least one node to the path based on the at least one signal; removing at least one node from the path based on the at least one signal; adding at least one edge to the path based on the at least one signal; or removing at least one edge from the path based on the at least one signal.

Clause 9. The method of any of the preceding clauses, wherein formulating the response to the query for output at the device comprises: passing the query, the path, and the at least one signal to the generative artificial intelligence model with an instruction to cause the generative artificial intelligence model to generate the response based on the query, the path, and the at least one signal; and receiving the response from the generative artificial intelligence model in response to the instruction, the query, the path, and the at least one signal.

Clause 10. The method of any of the preceding clauses, further comprising: using the generative artificial intelligence model, constructing the graph to comprise an inter-document graph of the document set and an intra-document graph of each document in the document set, wherein the intra-document graph comprises a root node corresponding to an identifier of the document and at least one non-root node connected to the root node via at least one edge; and using the identifier to link the at least one non-root node to a corresponding embedding stored in an embedding store.

Clause 11. The method of any of the preceding clauses, wherein constructing the graph comprises: passing the document set to the generative artificial intelligence model with an instruction to cause the generative artificial intelligence model to convert the document set into the graph in accordance with a graph template; and receiving the graph from the generative artificial intelligence model in response to the instruction, the document set, and the graph template.

Clause 12. A system comprising: at least one processor; and at least one memory coupled to the at least one processor, wherein the at least one memory comprises at least one instruction that, when executed by the at least one processor, cause the at least one processor to perform at least one operation comprising: parsing a query into a first query portion and at least one second query portion; matching an embedding of the at least one second query portion with an embedding that corresponds to a portion of a document of a document set; mapping the portion of the document to a first node of a graph; by a generative artificial intelligence model, constructing a graph query based on at least the first node; executing the graph query on the graph to identify a second node of the graph, wherein the second node corresponds to the first query portion; extracting a path from the graph, wherein the path comprises the first node, the second node, and at least one edge connecting the first node with the second node; and configuring the path for output at a device.

Clause 13. The system of clause 12, wherein constructing the graph query comprises: passing at least the first node of the graph to the generative artificial intelligence model with an instruction to cause the generative artificial intelligence model to generate and output the graph query based on at least the first node; receiving the graph query from the generative artificial intelligence model in response to at least the first node and the instruction; configuring the graph query for output at a device; and creating an updated version of the graph query based on at least one signal received via the device.

Clause 14. The system of clause 12 or clause 13, wherein executing the graph query on the graph to identify the second node of the graph comprises: creating a text representation of the graph; passing the text representation of the graph to the generative artificial intelligence model with an instruction to cause the generative artificial intelligence model to execute the graph query using the text representation of the graph; and receiving the second node from the generative artificial intelligence model in response to the instruction and the text representation of the graph.

Clause 15. The system of any of clauses 12-14, wherein extracting the path from the graph comprises: passing the first node and the second node to the generative artificial intelligence model with an instruction to cause the generative artificial intelligence model to determine the path based on the first node and the second node; and receiving the path from the generative artificial intelligence model in response to the instruction, the first node, and the second node.

Clause 16. At least one non-transitory machine-readable storage medium comprising at least one instruction that, when executed by at least one processor, causes the at least one processor to perform at least one operation comprising: parsing a query into a first query portion and at least one second query portion; matching an embedding of the at least one second query portion with an embedding that corresponds to a portion of a document of a document set; mapping the portion of the document to a first node of a graph; by a generative artificial intelligence model, constructing a graph query based on at least the first node; executing the graph query on the graph; identifying a second node of the graph, wherein the second node corresponds to the first query portion; and configuring a path for output at a device, wherein the path comprises the first node, the second node, and at least one edge connecting the first node with the second node in the graph.

Clause 17. The at least one non-transitory machine-readable storage medium of clause 16, wherein constructing the graph query comprises: passing at least the first node of the graph to the generative artificial intelligence model with an instruction to cause the generative artificial intelligence model to generate and output the graph query based on at least the first node; receiving the graph query from the generative artificial intelligence model in response to at least the first node and the instruction; configuring the graph query for output at a device; and creating an updated version of the graph query based on at least one signal received via the device.

Clause 18. The at least one non-transitory machine-readable storage medium of clause 16 or clause 17, wherein identifying the second node of the graph comprises: creating a text representation of the graph; passing the text representation of the graph to the generative artificial intelligence model with an instruction to cause the generative artificial intelligence model to execute the graph query using the text representation of the graph; and receiving the second node from the generative artificial intelligence model in response to the instruction and the text representation of the graph.

Clause 19. The at least one non-transitory machine-readable storage medium of any of clauses 16-18, wherein the at least one instruction, when executed by the at least one processor, causes the at least one processor to perform at least one operation comprising: passing the first node and the second node to the generative artificial intelligence model with an instruction to cause the generative artificial intelligence model to determine the path based on the first node and the second node; and receiving the path from the generative artificial intelligence model in response to the instruction, the first node, and the second node.

Clause 20. The at least one non-transitory machine-readable storage medium of any of clauses 16-19, wherein the at least one instruction, when executed by the at least one processor, causes the at least one processor to perform at least one operation comprising: using the generative artificial intelligence model, constructing the graph to comprise an inter-document graph of the document set and an intra-document graph of each document in the document set, wherein the intra-document graph comprises a root node corresponding to an identifier of the document and at least one non-root node connected to the root node via at least one edge; and using the identifier to link the at least one non-root node to a corresponding embedding stored in an embedding store.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
determining a first query portion and a second query portion of a query;
matching an embedding of the second query portion with an embedding of a portion of a digital content item;
mapping the portion of the digital content item to a first node of a graph;
by a generative machine learning model, constructing a graph query based on at least the first node;
via execution of the graph query on the graph, identifying a second node of the graph that maps to the first query portion;
extracting a first path from the graph, wherein the first path comprises the first node, the second node, and an edge connecting the first node with the second node;
creating a second path based on the first path and a signal received via a device; and
by the generative machine learning model, based on the second path, formulating a response to the query for output via the device.

2. The method of claim 1, wherein parsing the query comprises:
providing the query to the generative machine learning model with an instruction to cause the generative machine learning model to parse the query based on a graph template; and
receiving the first query portion and the second query portion from the generative machine learning model in response to the query and the instruction.

3. The method of claim 1, wherein mapping the portion of the digital content item to the first node of the graph comprises matching the embedding of the portion of the digital content item with the first node via a key comprising an identifier and an entity type.

4. The method of claim 1, wherein constructing the graph query comprises:
providing at least the first node of the graph to the generative machine learning model with an instruction to cause the generative machine learning model to generate and output the graph query based on at least the first node;
receiving the graph query from the generative machine learning model in response to at least the first node and the instruction;
configuring the graph query for output at a device; and
creating an updated version of the graph query based on a signal received via the device.

5. The method of claim 1, wherein executing the graph query on the graph to identify the second node of the graph comprises:

creating a text representation of the graph;

providing the text representation of the graph to the generative machine learning model with an instruction to cause the generative machine learning model to execute the graph query using the text representation of the graph; and receiving the second node from the generative machine learning model in response to the instruction and the text representation of the graph.

6. The method of claim 1, wherein extracting the first path from the graph comprises:

providing the first node and the second node to the generative machine learning model with an instruction to cause the generative machine learning model to determine the first path based on the first node and the second node; and receiving the first path from the generative machine learning model in response to the instruction, the first node, and the second node.

7. The method of claim 1, wherein configuring the first path for output at a device comprises:

providing the first path to the generative machine learning model with an instruction to cause the generative machine learning model to generate the output based on the first path; and receiving the output from the generative machine learning model in response to the instruction and the first path.

8. The method of claim 1, wherein creating the second path comprises at least one of:

adding a node to the first path based on the signal;

removing a node from the first path based on the signal;

adding an edge to the first path based on the signal; or removing an edge from the first path based on the signal.

9. The method of claim 1, wherein formulating the response to the query for output via the device comprises:

providing the query, the first path, and the signal to the generative machine learning model with an instruction to cause the generative machine learning model to generate the response based on the query, the first path, and the signal; and receiving the response from the generative machine learning model in response to the instruction, the query, the first path, and the signal.

10. The method of claim 1, further comprising:

using the generative machine learning model, constructing the graph to comprise an inter-item graph of a plurality of content items that includes the digital content item and an intra-item graph of each document in the plurality of content items, wherein the intra-item graph comprises a root node associated with an identifier of the digital content item and a non-root node connected to the root node via an edge; and using the identifier to link the non-root node to an embedding stored in an embedding store.

11. The method of claim 10, wherein constructing the graph comprises:

providing the plurality of content items to the generative machine learning model with an instruction to cause the generative machine learning model to convert the plurality of content items into the graph in accordance with a graph template; and receiving the graph from the generative machine learning model in response to the instruction, the plurality of content items, and the graph template.

12. A system comprising:

a processor; and a memory coupled to the processor, wherein the memory comprises an instruction that, when executed by the processor, causes the processor to:

determine a first query portion and a second query portion of a query;

match an embedding of the second query portion with an embedding of a portion of a digital content item;

map the portion of the digital content item to a first node of a graph;

by a generative machine learning model, construct a graph query based on at least the first node;

via execution of the graph query on the graph, identify a second node of the graph that maps to the first query portion;

extract a path from the graph, wherein the path comprises the first node, the second node, and an edge connecting the first node with the second node; and formulate the path for output at a device.

13. The system of claim 12, wherein constructing the graph query comprises:

providing at least the first node of the graph to the generative machine learning model with an instruction to cause the generative machine learning model to generate and output the graph query based on at least the first node;

receiving the graph query from the generative machine learning model in response to at least the first node and the instruction;

configuring the graph query for output at a device; and creating an updated version of the graph query based on a signal received via the device.

14. The system of claim 12, wherein executing the graph query on the graph to identify the second node of the graph comprises:

creating a text representation of the graph;

providing the text representation of the graph to the generative machine learning model with an instruction to cause the generative machine learning model to execute the graph query using the text representation of the graph; and receiving the second node from the generative machine learning model in response to the instruction and the text representation of the graph.

15. The system of claim 12, wherein extracting the path from the graph comprises:

providing the first node and the second node to the generative machine learning model with an instruction to cause the generative machine learning model to determine the path based on the first node and the second node; and receiving the path from the generative machine learning model in response to the instruction, the first node, and the second node.

16. A non-transitory machine-readable storage medium comprising an instruction that, when executed by a processor, causes the processor to:

determine a first query portion and a second query portion of a query;

match an embedding of the second query portion with an embedding of a portion of a digital content item;

map the portion of the digital content item to a first node of a graph;

by a generative machine learning model, construct a graph query based on at least the first node;

via the graph query, identify a second node of the graph that maps to the first query portion; and formulate a path for output at a device, wherein the path comprises the first node, the second node, and an edge connecting the first node with the second node.

17. The non-transitory machine-readable storage medium of claim 16, wherein constructing the graph query comprises:

providing at least the first node of the graph to the generative machine learning model with an instruction to cause the generative machine learning model to generate and output the graph query based on at least the first node;

receiving the graph query from the generative machine learning model in response to at least the first node and the instruction;

configuring the graph query for output at a device; and creating an updated version of the graph query based on a signal received via the device.

18. The non-transitory machine-readable storage medium of claim 16, wherein identifying the second node of the graph comprises:

creating a text representation of the graph;

providing the text representation of the graph to the generative machine learning model with an instruction to cause the generative machine learning model to execute the graph query using the text representation of the graph; and receiving the second node from the generative machine learning model in response to the instruction and the text representation of the graph.

19. The non-transitory machine-readable storage medium of claim 16, wherein the instruction, when executed by the processor, causes the processor to:

provide the first node and the second node to the generative machine learning model with an instruction to cause the generative machine learning model to determine the path based on the first node and the second node; and receive the path from the generative machine learning model in response to the instruction, the first node, and the second node.

20. The non-transitory machine-readable storage medium of claim 16, wherein the instruction, when executed by the processor, causes the processor to:

use the generative machine learning model, constructing the graph to comprise an inter-item graph of a plurality of content items including the digital content item and an intra-item graph of each content item in the plurality of content items, wherein the intra-item graph comprises a root node associated with an identifier of a respective content item and a non-root node connected to the root node via an edge; and use the identifier to link the non-root node to a stored embedding.

* * * * *